United States Patent
Cherian et al.

(10) Patent No.: US 9,300,137 B2
(45) Date of Patent: Mar. 29, 2016

(54) DYNAMIC DISTRIBUTED POWER GRID CONTROL SYSTEM

(75) Inventors: Sunil Cherian, Fort Collins, CO (US); Oliver Pacific, Katy, TX (US)

(73) Assignee: Spirae, Inc., Fort Collins, CO (US)

(*) Notice: Subject to any disclaimer, the term of this patent is extended or adjusted under 35 U.S.C. 154(b) by 712 days.

(21) Appl. No.: 13/099,322

(22) Filed: May 2, 2011

(65) Prior Publication Data
US 2012/0029897 A1  Feb. 2, 2012

Related U.S. Application Data

(63) Continuation-in-part of application No. 12/846,520, filed on Jul. 29, 2010, now Pat. No. 8,401,709.

(51) Int. Cl.
*G06F 1/28* (2006.01)
*G06G 7/62* (2006.01)
(Continued)

(52) U.S. Cl.
CPC ............ *H02J 3/14* (2013.01); *G05B 19/0421* (2013.01); *G06Q 10/06* (2013.01); *G06Q 50/06* (2013.01); *H02J 3/00* (2013.01); *H02J 3/16* (2013.01); *H02J 3/383* (2013.01); *H02J 3/386* (2013.01); *H02J 13/00* (2013.01); *H02J 13/001* (2013.01); *H02J 13/0062* (2013.01); *H02J 13/0079* (2013.01); *H02J 13/0086* (2013.01); *Y02B 70/3225* (2013.01); *Y02B 70/3241* (2013.01);
(Continued)

(58) Field of Classification Search
CPC ..... G06Q 10/06; G06Q 50/06; H02J 13/0086; H02J 13/16; H02J 3/382; H02J 13/001; H02J 13/0062; H02J 13/0079; H02J 3/14; H02J 2003/007; Y02B 70/3225; Y02E 40/34; Y04S 10/123; Y04S 20/222
USPC ......................................................... 700/286
See application file for complete search history.

(56) References Cited

U.S. PATENT DOCUMENTS 7,058,617 B1 * 6/2006 Hartman et al. ................ 706/16
7,813,814 B2 * 10/2010 Dittes ............................. 700/2
(Continued)

FOREIGN PATENT DOCUMENTS

WO    WO 03/073182    9/2003

OTHER PUBLICATIONS

Dumitrescu et al, "GangSim: A Simulator for Grid Scheduling Studies", Mar. 2006, pp. 1-8.*

(Continued)

*Primary Examiner* — Carlos Ortiz Rodriguez
*Assistant Examiner* — Olvin Lopez Alvarez
(74) *Attorney, Agent, or Firm* — Martensen IP

(57) ABSTRACT

A control system for a distributed power grid includes a simulation module operative to directly interface with operational control of distributed energy resources (DER) to develop and when necessary dynamically modify control inputs of the distributed power grid. By conducting a decentralized and distributed simulation of DER topology (components and their surrounding infrastructure) each distributed control module can simulate control response characteristics of a plurality of DER to determine a control methodology necessary to achieve a desired target. Once developed the same control inputs can be directly applied to physical DER and thereafter monitored to validate performance. Once validated, operational control of the DER is established while ongoing modifications of the control inputs continues in parallel to maintain desired performance.

33 Claims, 15 Drawing Sheets

(51) Int. Cl.
*H02J 3/14* (2006.01)
*G05B 19/042* (2006.01)
*H02J 3/00* (2006.01)
*H02J 13/00* (2006.01)
*G06Q 10/06* (2012.01)
*G06Q 50/06* (2012.01)
*H02J 3/16* (2006.01)
*H02J 3/38* (2006.01)

(52) U.S. Cl.
CPC .............. *Y02E 10/563* (2013.01); *Y02E 10/763* (2013.01); *Y02E 40/34* (2013.01); *Y02E 40/72* (2013.01); *Y02E 60/74* (2013.01); *Y04S 10/123* (2013.01); *Y04S 10/30* (2013.01); *Y04S 20/222* (2013.01); *Y04S 20/227* (2013.01)

(56) References Cited

U.S. PATENT DOCUMENTS

| | | | |
|---|---|---|---|
| 7,979,239 B2* | 7/2011 | Trias | 702/182 |
| 2003/0033133 A1* | 2/2003 | Kleyer | 703/22 |
| 2003/0084157 A1* | 5/2003 | Graupner et al. | 709/226 |
| 2007/0005315 A1 | 1/2007 | Evans | |
| 2007/0124026 A1 | 5/2007 | Troxell | |
| 2007/0239373 A1 | 10/2007 | Nasle | |
| 2007/0285079 A1 | 12/2007 | Nasle | |
| 2008/0027704 A1* | 1/2008 | Kephart et al. | 703/22 |
| 2008/0049013 A1 | 2/2008 | Nasle | |
| 2008/0077368 A1 | 3/2008 | Nasle | |
| 2008/0109205 A1 | 5/2008 | Nasle | |
| 2008/0120080 A1 | 5/2008 | Nasle | |
| 2008/0167844 A1 | 7/2008 | Nasle et al. | |
| 2008/0262820 A1 | 10/2008 | Nasle | |
| 2008/0263469 A1 | 10/2008 | Nasle et al. | |
| 2009/0063132 A1 | 3/2009 | Miyazaki | |
| 2009/0070062 A1* | 3/2009 | Kirrmann et al. | 702/122 |
| 2009/0076749 A1 | 3/2009 | Nasle | |
| 2009/0083019 A1 | 3/2009 | Nasle | |
| 2009/0099832 A1 | 4/2009 | Nasle | |
| 2009/0105998 A1 | 4/2009 | Radibratovic et al. | |
| 2009/0319093 A1* | 12/2009 | Joos et al. | 700/297 |
| 2010/0114400 A1* | 5/2010 | Feng et al. | 700/298 |
| 2010/0179800 A1* | 7/2010 | Nam | G01R 31/088 703/18 |
| 2010/0204948 A1* | 8/2010 | Kirrmann et al. | 702/117 |
| 2010/0217550 A1* | 8/2010 | Crabtree et al. | 702/62 |
| 2010/0262411 A1 | 10/2010 | Nasle et al. | |
| 2010/0268396 A1 | 10/2010 | Nasle et al. | |
| 2010/0292857 A1* | 11/2010 | Bose et al. | 700/292 |
| 2011/0029102 A1* | 2/2011 | Campney et al. | 700/83 |
| 2011/0040666 A1* | 2/2011 | Crabtree et al. | 705/37 |
| 2011/0071970 A1* | 3/2011 | Massie et al. | 706/21 |
| 2011/0082596 A1 | 4/2011 | Meagher et al. | |
| 2011/0082597 A1 | 4/2011 | Meagher | |
| 2011/0093127 A1 | 4/2011 | Kaplan | |
| 2011/0257956 A1* | 10/2011 | Goel et al. | 703/18 |
| 2011/0282508 A1* | 11/2011 | Goutard et al. | 700/293 |

OTHER PUBLICATIONS

Calheiros et al, "CloudSim: a toolkit for modeling and simulation of cloud computing environments and evaluation of resource provisioning algorithms", Aug. 2010, pp. 23-50.*

Buyya et al "GridSim: A Toolkit for the Modeling and Simulation of Distributed Resource Management and Scheduling for Grid Computing", 2002, pp. 1-37.*

Lugo, "Distributed and Decentralized Control of the Power Grid" 2010, pp. 172.*

Triangle MicroWorks, Inc, "SCADA Data Gateway Configuration Guide Software Release Version 2.50", 2008, pp. 168.*

Triangle Microworks, Inc. "SCADA Data Gateway", May 22, 2005, pp. 3.*

Rogers et al, "An Authenticated Control Framework for Distributed Voltage Support on the Smart Grid", Jun. 2010, pp. 40-47.*

Lugo et al, "Agent Technologies for Control Applications in the Power Grid", Jan. 2010, pp. 1-10.*

Lund, "The Danish Cell Project—Part 1: Background and General Approach", Jun. 2007, IEEE, pp. 1-6.*

Cherian et al, "The Danish Cell Project—Part 2: Verification of Control Approach via Modeling and Laboratory Tests", Jun. 2007, IEEE, pp. 1-5.*

Pipattanasomporn et al, "Multi-Agent Systems in a Distributed Smart Grid: Design and Implementation", Mar. 2009, IEEE, pp. 1-8.*

Ghosn et al, "Agent-oriented Designs for a Self Healing Smart Grid", 2010, IEEE, pp. 461-466.*

Meliopoulos et al, "A Laboratory Setup of a Power System Scaled Model for Testing and Validation of EMS Applications" Jun. 2009, IEEE, pp. 1-8.*

* cited by examiner

DYNAMIC DISTRIBUTED POWER GRID CONTROL SYSTEM

RELATED APPLICATION

The present application is a Continuation-in-Part of and claims priority to U.S. patent application Ser. No. 12/846,520 filed Jul. 29, 2010, which is hereby incorporated by reference in its entirety for all purposes as if fully set forth herein.

BACKGROUND OF THE INVENTION

1. Field of the Invention

Embodiments of the present invention relate, in general, to power grids and more particularly to systems and methods for controlling allocation, production, and consumption of power in an electric power grid.

2. Relevant Background

An electrical grid is not a single entity but an aggregate of multiple networks and multiple power generation companies with multiple operators employing varying levels of communication and coordination, most of which are manually controlled. A smart grid increases connectivity, automation and coordination among power suppliers and power consumers and the networks that carry that power for performing either long-distance transmissions or local distribution.

Today's alternating current power grid was designed in the latter part of the 19th century. Many of the implementation decisions and assumptions that were made then are still in use today. For example, the current power grid includes a centralized unidirectional electric power transmission system that is demand driven. Over the past 50 years the electrical grid has not kept pace with modern challenges. Challenges such as security threats, national goals to employ alternative energy power generation, conservation goals, a need to control peak demand surges, uninterruptible demand of power, and new digital control devices put in question the ability of today's electrical distribution grid. To better understand the nature of these challenges, a firm grasp of current power generation and distribution is necessary.

The existing power grid starts at a power generation plant and thereafter distributes electricity through a variety of power transmission lines to the power consumer. The power producer or supplier in almost all cases consists of a spinning electrical generator. Sometimes the spinning generators are driven by a hydroelectric dam, large diesel engines or gas turbines, but in most cases the generator is powered by steam. The steam may be created by burning coal, oil, natural gas or in some cases a nuclear reactor. Electric power can also be produced by chemical reactions, direct conversion from sunlight and many other means.

The power produced by these generators is alternating current. Unlike direct current, alternating current oscillates much like a sine wave over a period of time. Alternating current (AC) operating as a single sine wave is called single phase power. Existing power plants and transmission lines carry three different phases of AC power simultaneously. Each of these phases is offset 120° from each other and each phase is distributed separately. As power is added to the grid, it must be synchronized with the existing phase of the particular transmission line it is utilizing.

As this three-phase power leaves the generator from a power station, it enters a transmission substation where the generated voltage is up-converted to an extremely high number for long-distance transmission. Then, upon reaching a regional distribution area, the high transmission voltage is stepped down to accommodate a local or regional distribution grid. This step down process may happen in several phases and usually occurs at a power substation.

FIG. 1 shows a typical power distribution grid as is known to one skilled in the art. As shown, three power generation plants 110 service three distinct and separate regions of power consumers 150. Each power plant 110 is coupled to its power consumer 150 via distribution lines 140. Interposed between the power producer 110 and the power consumer 150 are one or more transmission substations 125 and power sub-stations 130. FIG. 1 also shows that the power production plants are linked via high-voltage transmission lines 120.

From each power production plant 110, power is distributed to the transmission substation 125 and thereafter, stepped down to the power substations 130 which interface with a distribution bus, placing electricity on a standard line voltage of approximately 7200 volts. These power lines are commonly seen throughout neighborhoods across the world, and carry power to the end-user 150. Households and most businesses require only one of the three phases of power that are typically carried by the power lines. Before reaching each house, a distribution transformer reduces the 7200 volts down to approximately 240 volts and converts it to normal household electrical service.

The current power distribution system involves multiple entities. For example, production of power may represent one entity; while the long distance transmission of power another. Each of these companies interacts with one or more distribution networks that ultimately deliver power to the power consumer. While the divisions of control described herein are not absolute, they nonetheless represent a hurdle for dynamic control of power over a distributed power grid.

Under the current power distribution grid, should the demand for power by a group of power consumers exceed the production capability of their associated power production facility, that facility can purchase excess power from other producers of networked power. There is a limit to the distance power can be reliably and efficiently transported, thus as consumer demand increases, more regional power producers are required. The consumer has little control over who produces the power it consumes.

Electrical distribution grids of this type have been in existence and use for over 100 years. And while the overall concept has not significantly changed, it has become extremely pervasive and has been reasonably reliable. However, it is becoming increasingly clear that the existing power grid is antiquated, and that new and innovative control systems are necessary to modify the means by which power is efficiently distributed from the producer to the consumer. For example, when consumer demand for power routinely exceeds the production capability of a local power production facility, the owner and operator of the local power network considers adding additional power production capability, or alternatively, a portion of the consumers are denied service, i.e. brown-outs. To add additional power to the grid, a complicated and slow process is undertaken to understand and control new electrical power distribution options. The capability of the grid to handle the peak demands must be known and monitored to ensure safe operation of the grid, and, if necessary, additional infrastructure must be put in place. This process can take years and fails to consider the dynamic nature of electrical production and demand.

One aspect highlighting the need to modify existing power distribution control systems is the emergence of alternative and renewable power production sources, distributed storage systems, demand management systems, smart appliances, and intelligent devices for network management. These options each require active power management of the distribution network, substantially augmenting the control strategies that are currently utilized for distribution power network management.

Existing network management solutions lack the distributed intelligence to manage power flow across the network on a multitude of timescales. This void is especially evident, since new power generation assets being connected to the grid are typically owned by different organizations and can be used for delivering different benefits to different parties at different times. Conventional electric power system management tools are designed to operate network equipment and systems owned by the network operators themselves. They are not designed to enable dynamic transactions between end-users (power consumers), service providers, network operators, power producers, and other market participants.

Existing power grids were designed for one-way flow of electricity and if a local sub-network or region generates more power than it is consuming, the reverse flow of electricity can raise safety and reliability issues. A challenge, therefore, exists to dynamically manage power production and network assets in real time, and to enable dynamic transactions between various energy consumers, asset owners, service providers, market participants, and network operators. Since changes have to be made to the existing electric power system to add dynamic power management capabilities using different resources and under various conditions, an additional challenge exists to model and simulate the behavior of the power system using different power management strategies. These and other challenges present in the current power distribution grid are addressed by one or more embodiments of the present invention.

SUMMARY OF THE INVENTION

A system for dynamic control and distribution of power over a distributed power grid is hereafter described by way of example. According to one embodiment of the present invention, a multi-layered control architecture is integrated into the existing power transmission and distribution grid, so as to enable dynamic management of power production, distribution, storage, and consumption (collectively distributed energy resources). This dynamic control is complemented by the ability to model proposed power distribution solutions prior to implementation, thereby validating that the proposed power distribution solution will operate within the existing infrastructure's physical and regulatory limitations. According to one embodiment of the present invention, the multi-layered control system is coupled with a simulation of the electric power system and grid connected distributed energy resources in such a way that the behavior of the overall system (electric power system along with the controlling multi-layered control system) is accurately simulated. This invention enables the plurality of control modules within the multi-layered control system to control appropriate portions of the simulated power system, in the same way it would in the real world. This is a significant aspect of this invention since the multi-layered control system and the power system simulation can be run as independent, but communicatively coupled systems.

According to one embodiment of the present invention, a distributed control system is interfaced with an existing power distribution grid to efficiently control power production and distribution. The distributed control system has three primary layers: i) enterprise control module, ii) regional control modules, and iii) local control modules. An enterprise control module is communicatively coupled to existing supervisory control and data acquisition systems, and to a plurality of regional control modules. The regional control modules are integrated into existing transmission sub-stations and distribution sub-stations to monitor and issue control signals to other devices or control modules to dynamically manage power flows on the grid. Each regional control module is further associated with a plurality of local control modules that interface with power producers, including steam driven electric generators, wind turbine farms, hydroelectric facilities and photoelectric (solar) arrays, storage resources such as thermal or electric storage devices and batteries on electric vehicles, and demand management systems or smart appliances Each local control module falls under the direction of a regional control module for management and control of its associated power producer, consumer, or device. By standardizing control responses, the regional control module is operable to manage power production, distribution, storage and consumption within its associated region. In another embodiment of the present invention, regional control modules, via the enterprise control module, can identify a request for additional power production. Knowing the production capability of other regional areas and whether they possess excess capacity, the enterprise control module can direct a different regional control module to increase power production to produce excess power or tap stored energy. The excess power can then be transmitted to the region in need of power for distribution.

According to another embodiment of the present invention, modifications to the power production and distribution system can be simulated in real time to determine whether a proposed solution to meet power generation and consumption fluctuations is within regulatory, safety guidelines and/or system capabilities. A simulation system that operates in conjunction with various modules of the multi-layered control system utilizes real time information from the power system and predicts the consequences of control actions prior to issuing the control actions to connected systems. Each control module includes an associated simulation module that knows the structure of the network, network-connected DER, and their salient characteristics that fall within the control modules visibility and operating range. The simulation module performs state estimation to determine conditions at locations that are not directly measured, gage the validity of actual measurements, and estimate the conditions that might result as a consequence of specific actions or sequence of actions. This approach utilizes distributed control modules and simulation modules to carry out these operations in subsections of the power system within their own range of operations and in near real time. Upon validating that a system-proposed solution can be achieved, it can be implemented using real-time controls.

Another aspect of the present invention includes managing enterprise level power load demands, energy production and distribution across a power grid. As demand changes are driven by a plurality of power consumers, the enterprise control module can detect the need for additional power by one or more regional control modules. In addition, the enterprise control module can receive data regarding each regional control module's ability to produce excess power in relation to its local consumer demand. The enterprise control module can issue commands to one or more regional control modules to increase power production or decrease consumption as well as reroute excess power. Receiving such a command, the regional control modules communicate with the power producers within its region to increase power production. The command transmitted to each power producer is standardized to ensure consistent production response by the variety of power production options associated with a distributed power grid. The local control modules and the regional control modules are also capable of independently taking action to keep supply and demand in balance if very fast action is required to keep the system in a stable operating condition.

The present invention further possesses the ability to automatically respond to changes in network structure, asset availability, power generation levels, or load conditions without requiring any reprogramming According to one embodiment of the present invention the enterprise control modules as well as the regional and local control modules possess knowledge of known components of the distributed energy grid. As new components of a known class are connected to the grid, for example an additional wind turbine, the various layers of the present invention immediately recognized it as a wind turbine possessing particular characteristics and capabilities. Knowing these characteristics and capabilities the present invention can issue commands seamlessly with respect to the production of power and its distribution. Upon a command being issued the regional and local control modules can provide to each component the correct information such that it will be understood by that device and perform as expected. The present invention also possesses the capability to recognize components that are foreign to the distributed grid. Upon an unrecognized device being coupled to the grid, the local control module initiates an inquiry to identify that devices characteristics, properties, and capabilities. That information is added to the repository of information and is thereafter used to facilitate communication with and control of the device. This process may be manual or automatic. This new information immediately propagates to appropriate system modules and monitoring, control, network, and simulation activities can take advantage of the capabilities offered by the new device automatically.

The present invention further enables the enterprise control module to expose functional capabilities to other applications for implementing different types of services. Examples include a feeder peak load management application that uses an import/export function provided by the controller to limit the maximum load experienced by that feeder at the substation, and a reliability application that can issue an "island" command to a regional control module to separate from the grid and operate independently using local generation resources and load control. By using functional capabilities exposed by the enterprise control module, many applications can use power generating, consuming, and assets storing capabilities of the network without compromising its stability or violating operating limits.

The present invention provides method and systems to enable general transactions between different service providers and service subscribers automatically (dynamic transactions between power consumers, service providers, network operators, power producers, and other market participants), while maintaining the stability and reliability of grid operations. The multi-layered approach of the present invention provides a stable interface between applications which operate on the front end of the system and devices which interface with the back end. In doing so both applications and devices experience a "Plug and Play" experience which is capitalized upon to manage the distributed power grid. An example would be how a peak load management application automatically finds and uses available generators to ensure that a demand limit is not exceeded on a distribution feeder. This is analogous to a word processing application automatically finding an available network printer when needed.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 3A:
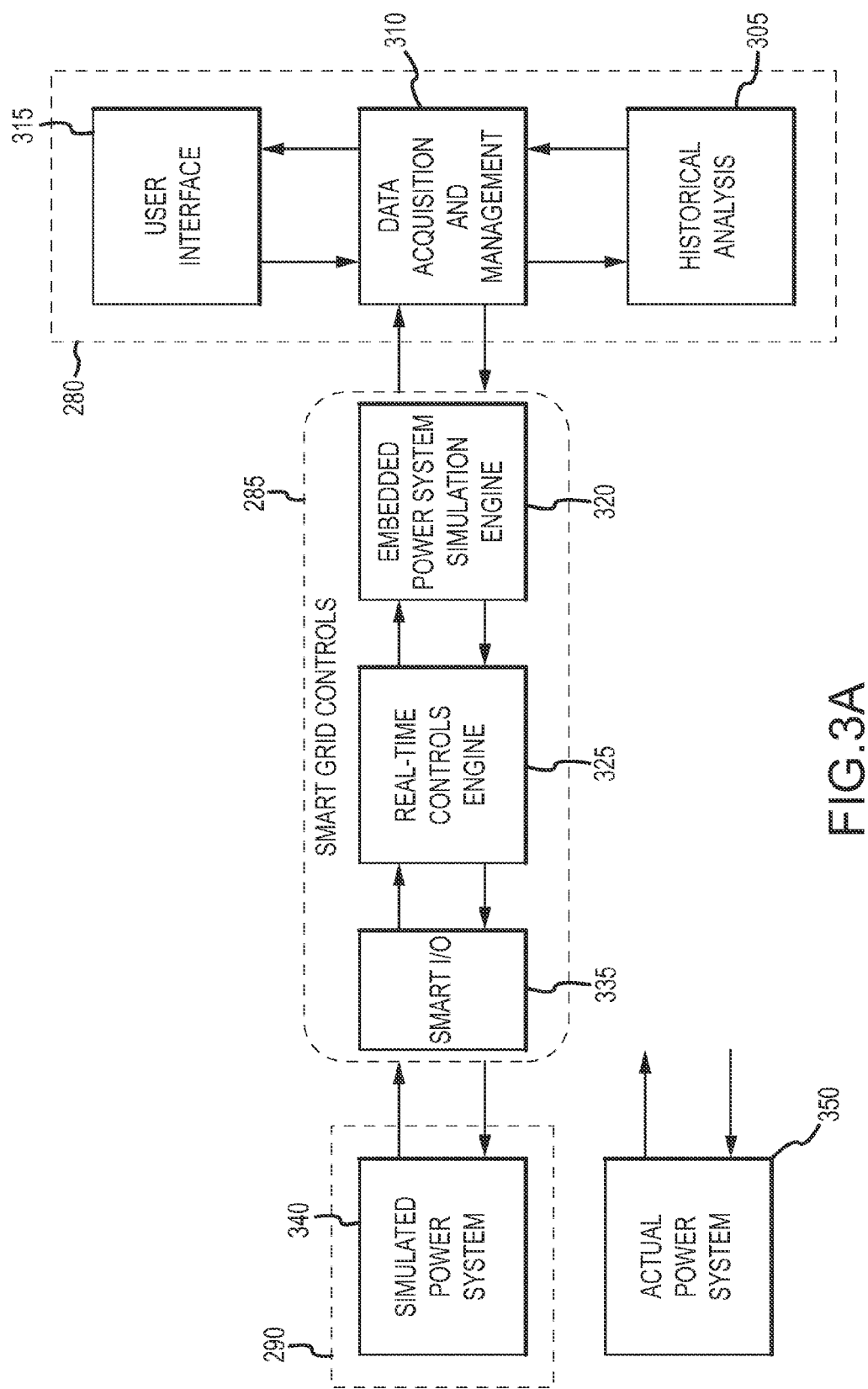
FIG. 3A is a high level block diagram showing a process flow for implementing distributed control methodology into a simulated power system according to one embodiment of the present invention.
Figure 3B:
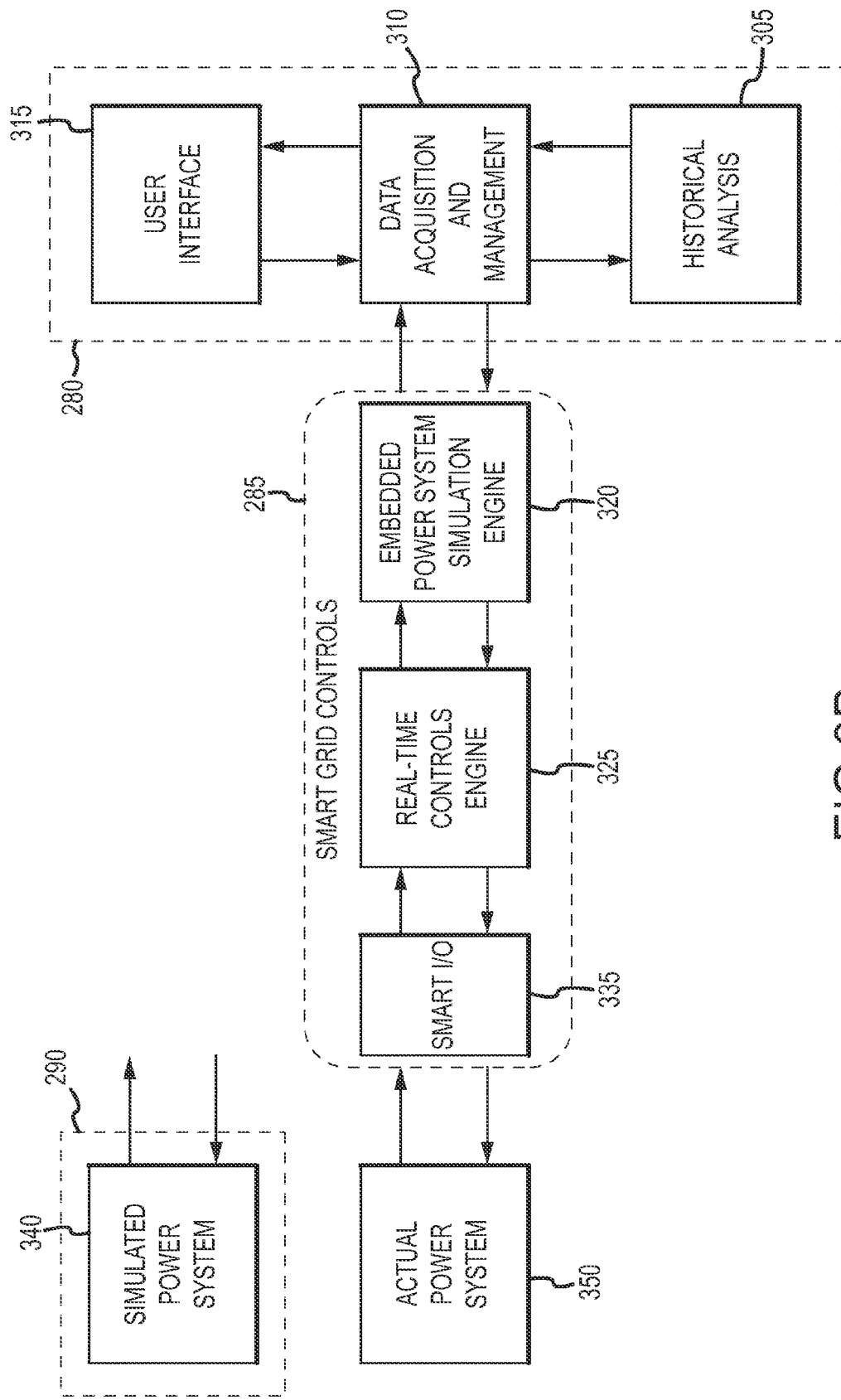
Figure 4:
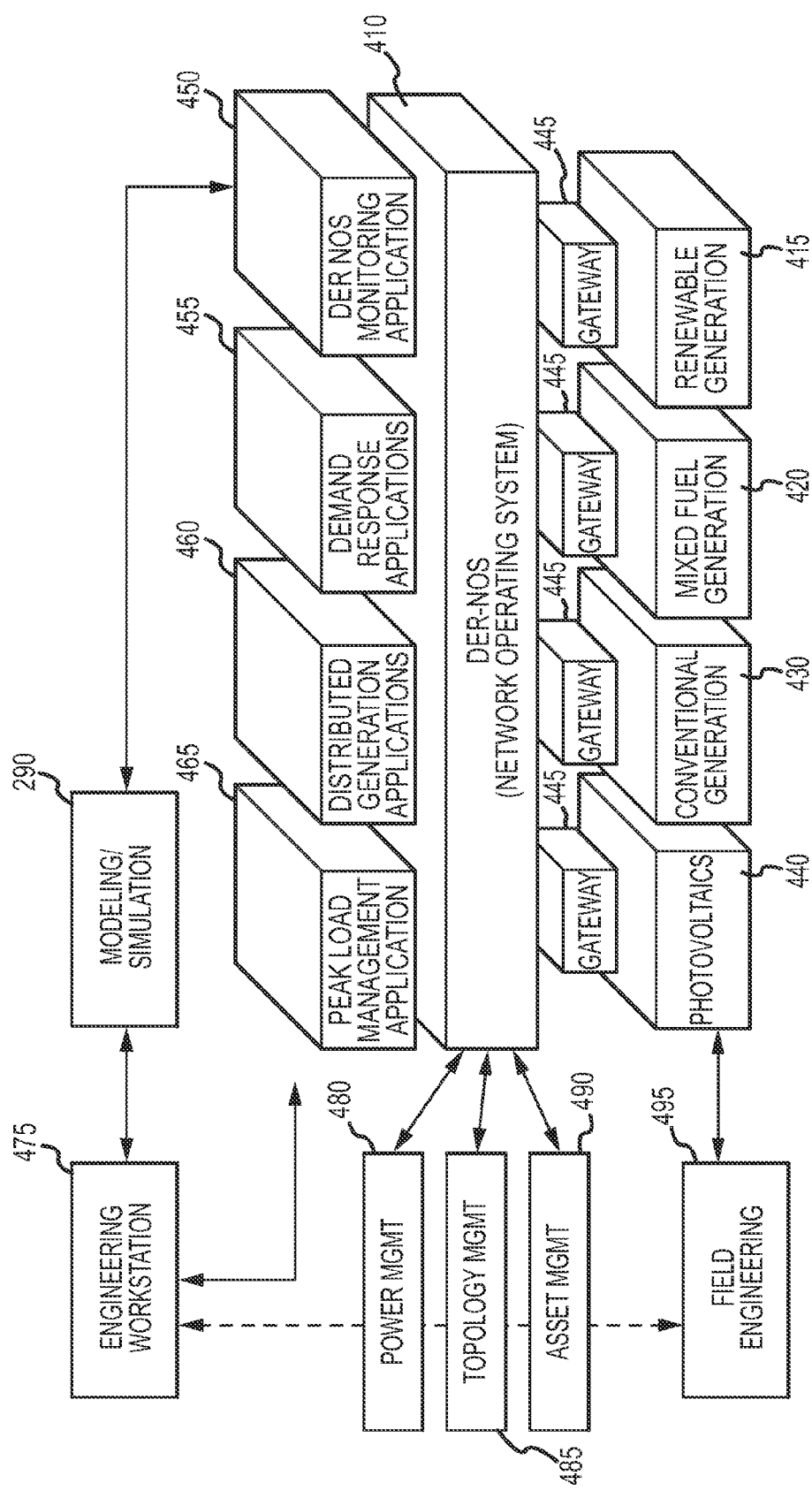
Figure 5:
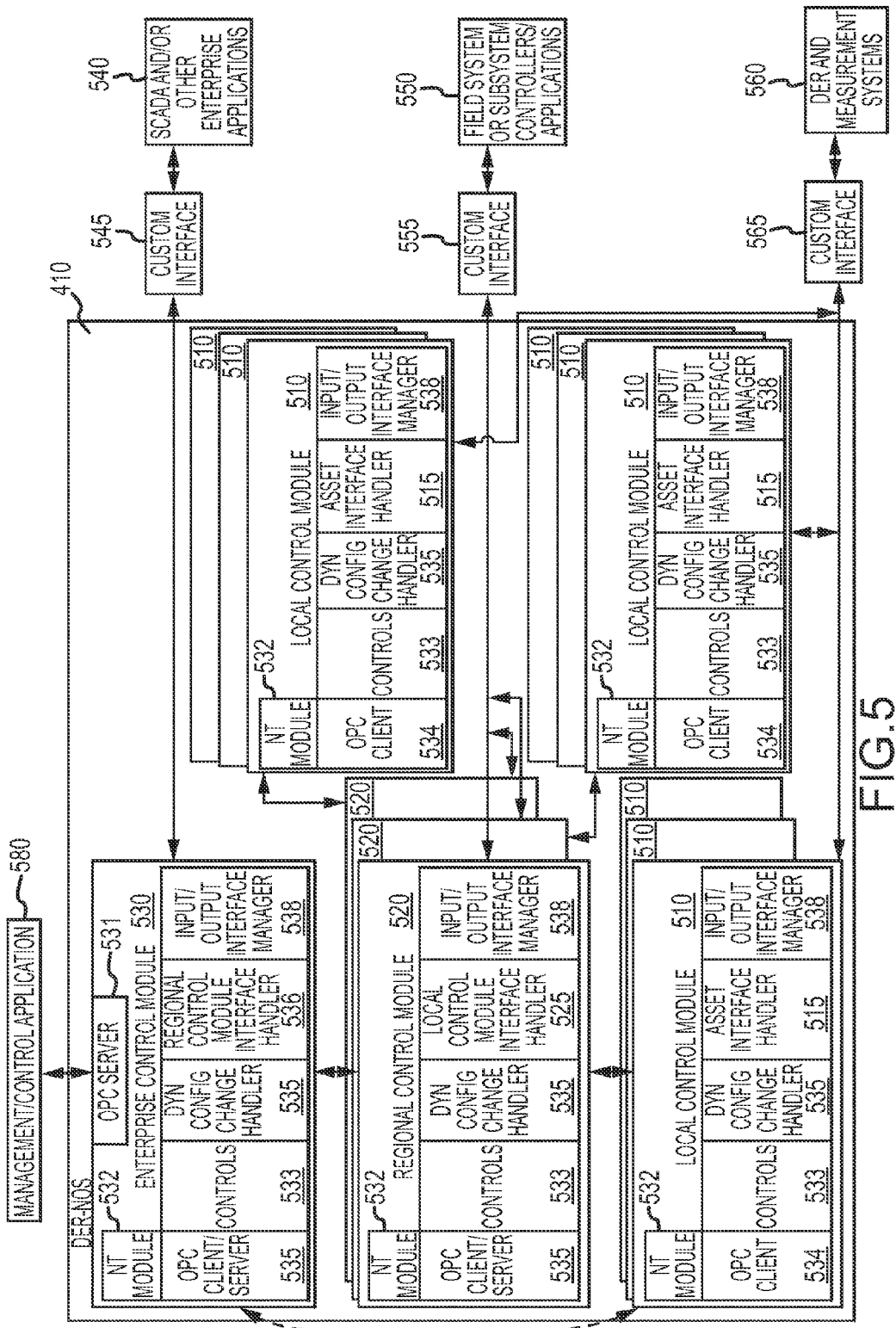
Figure 6:
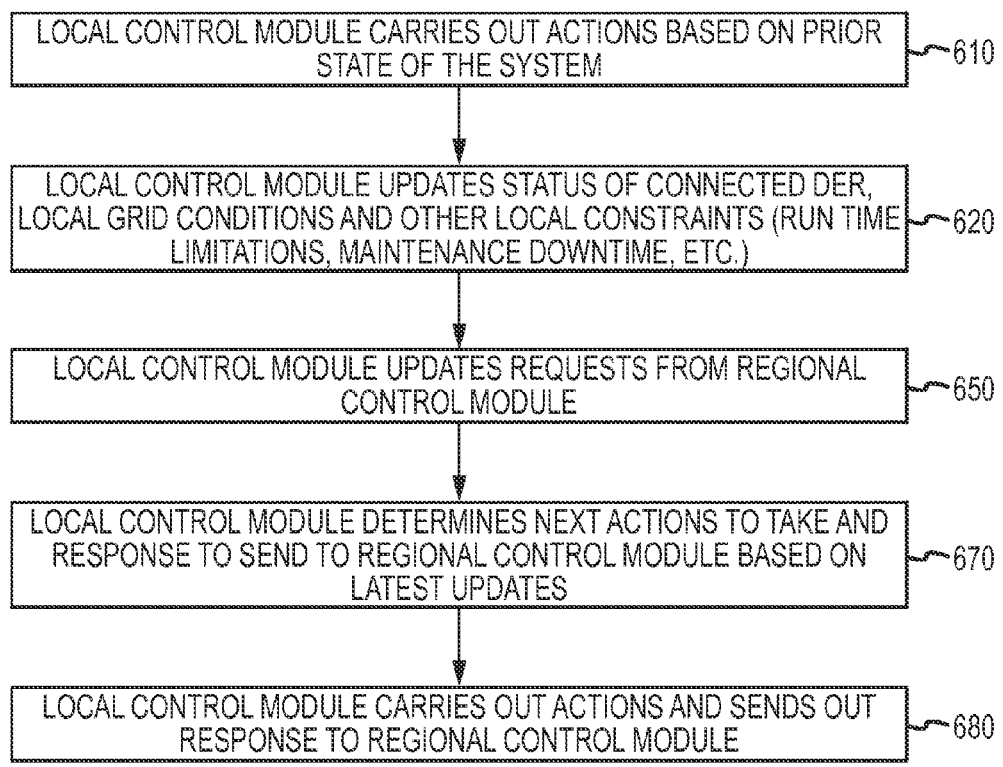
Figure 7:
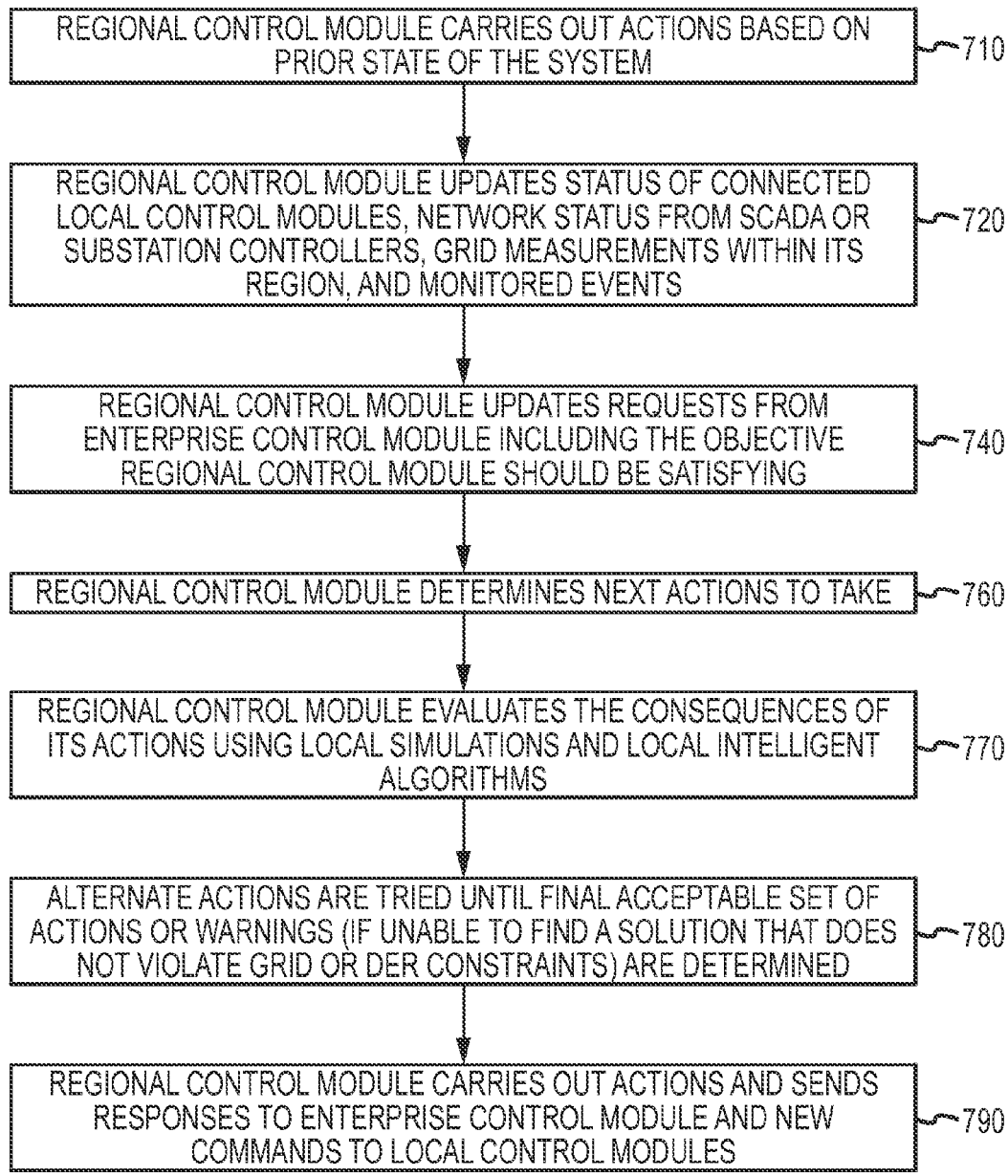
Figure 8:
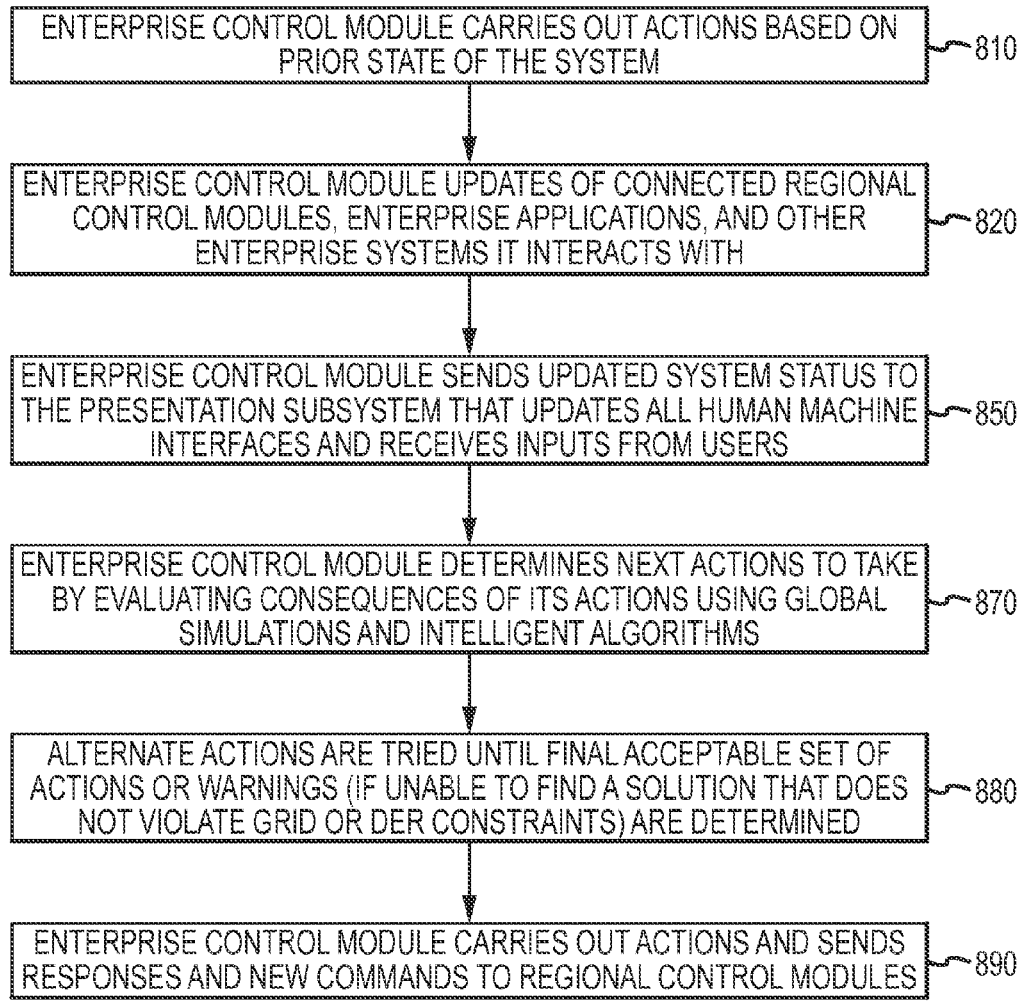
Figure 9:
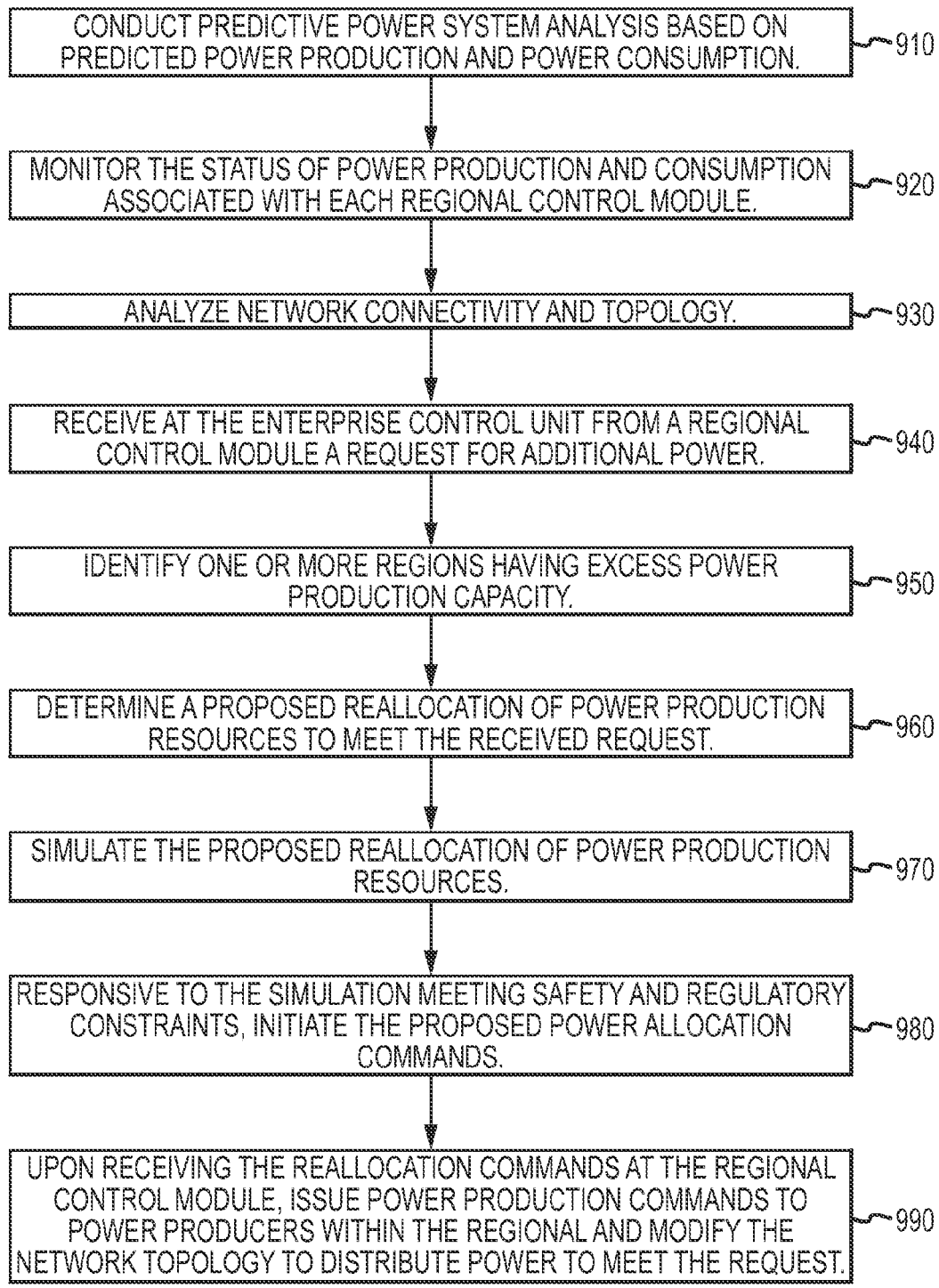
Figure 10:
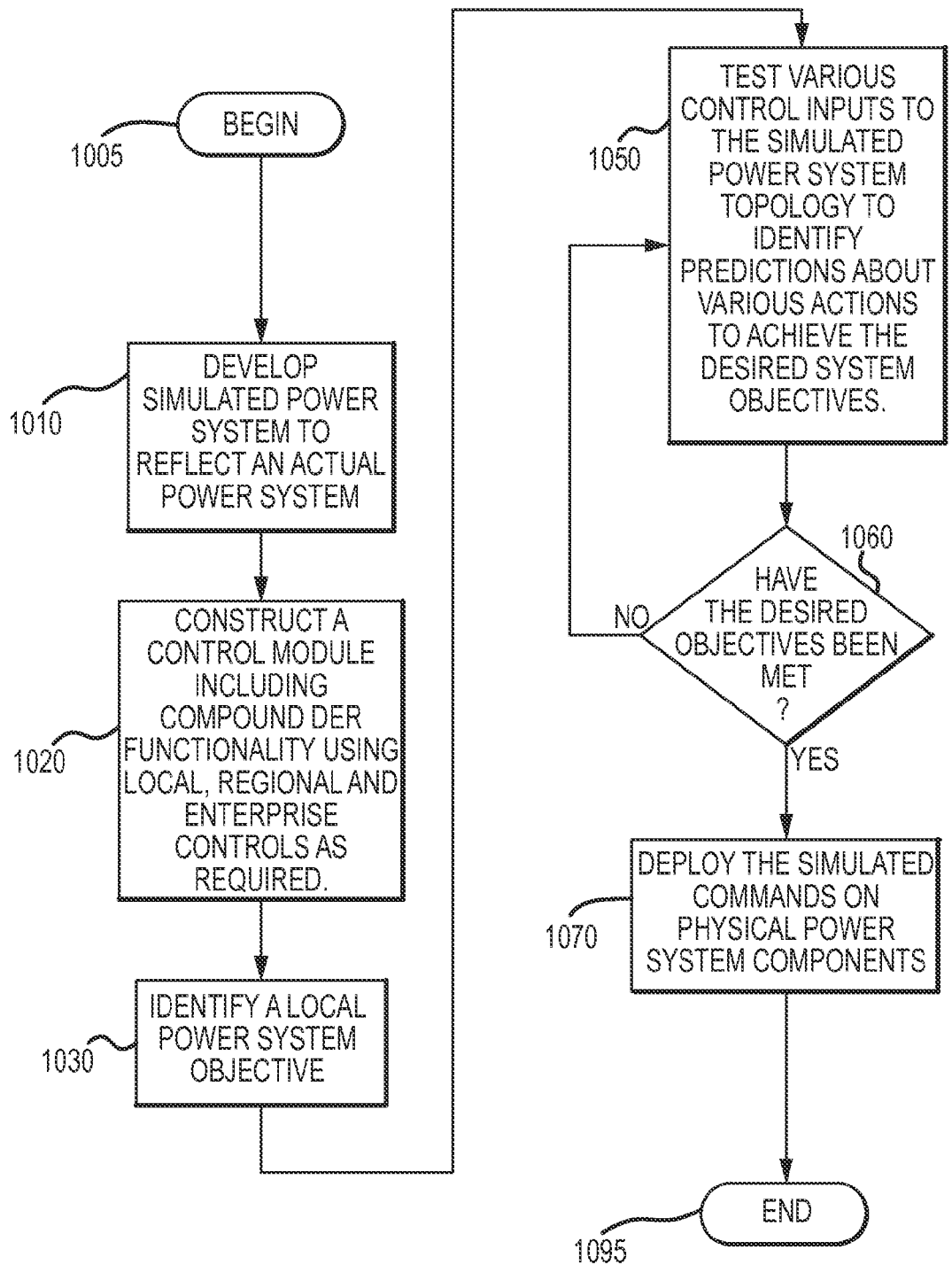
Figure 11A:
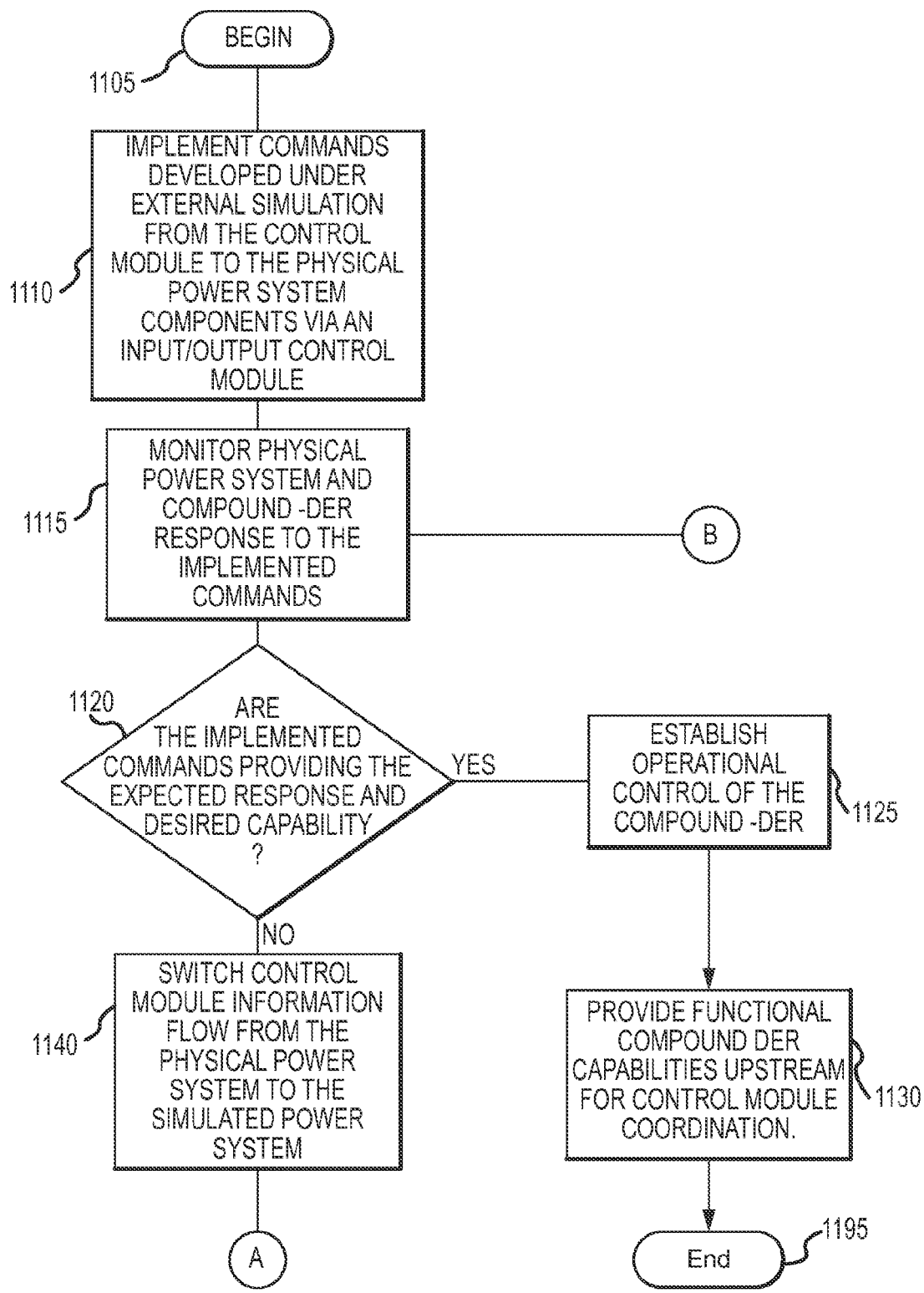
Figure 11B:
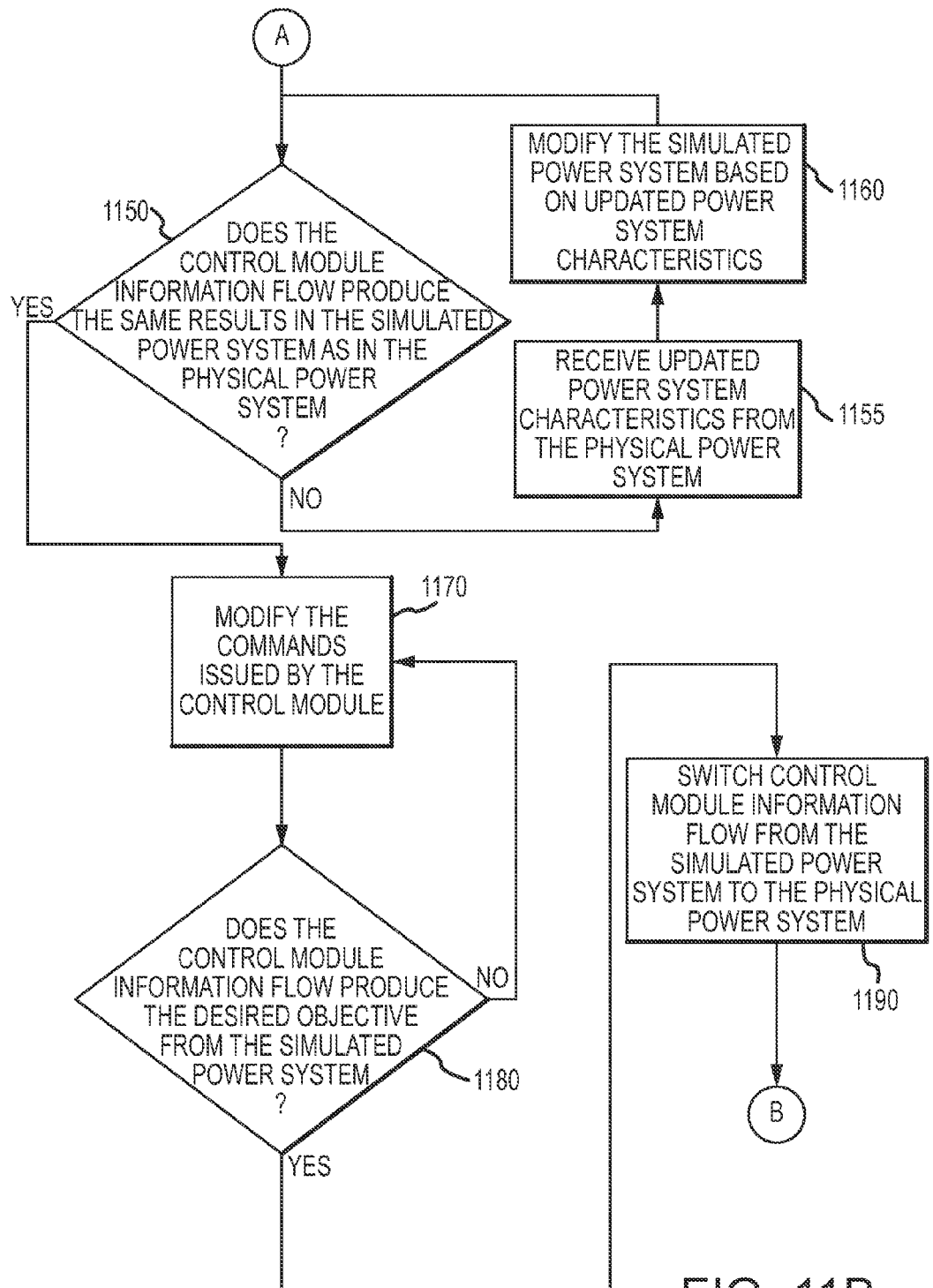

3B is a high level block diagram showing a process flow for implementing the distributed control methodology tested in 3A using a simulated power system into an actual power system without making any changes to the control methodology according to one embodiment of the present invention;

FIG. 4 is a high level functional block diagram of a distributed energy resource network operating system (an alternative embodiment of the smart grid controls presented in FIGS. 3A and 3B) for power production, topology and asset management according to one embodiment of the present invention, wherein new applications are using the functional capabilities exposed by a distributed energy resources network operating system to implement more complex system capabilities as described in herein;

FIG. 5 is a high level block diagram of a multilayered architecture for controlling a distributed power grid according to one embodiment of the present invention;

FIG. 6 is a flowchart for local control module operations according to one embodiment of the present invention;

FIG. 7 is a flowchart for regional control module operations according to one embodiment of the present invention;

FIG. 8 is a flowchart for enterprise control module operations according to one embodiment of the present invention;

FIG. 9 is a flowchart of one method embodiment for controlling power distribution and production in a distributed power grid according to the present invention in which demand reduction is captured as negative generation;

FIG. 10 is a flowchart of one method embodiment for simulating a distributed power grid topology and its associated power systems;

FIGS. 11A and 11B combine to form a flowchart of one method embodiment for deploying and validating controls developed with a simulated power system.

Figure 12:
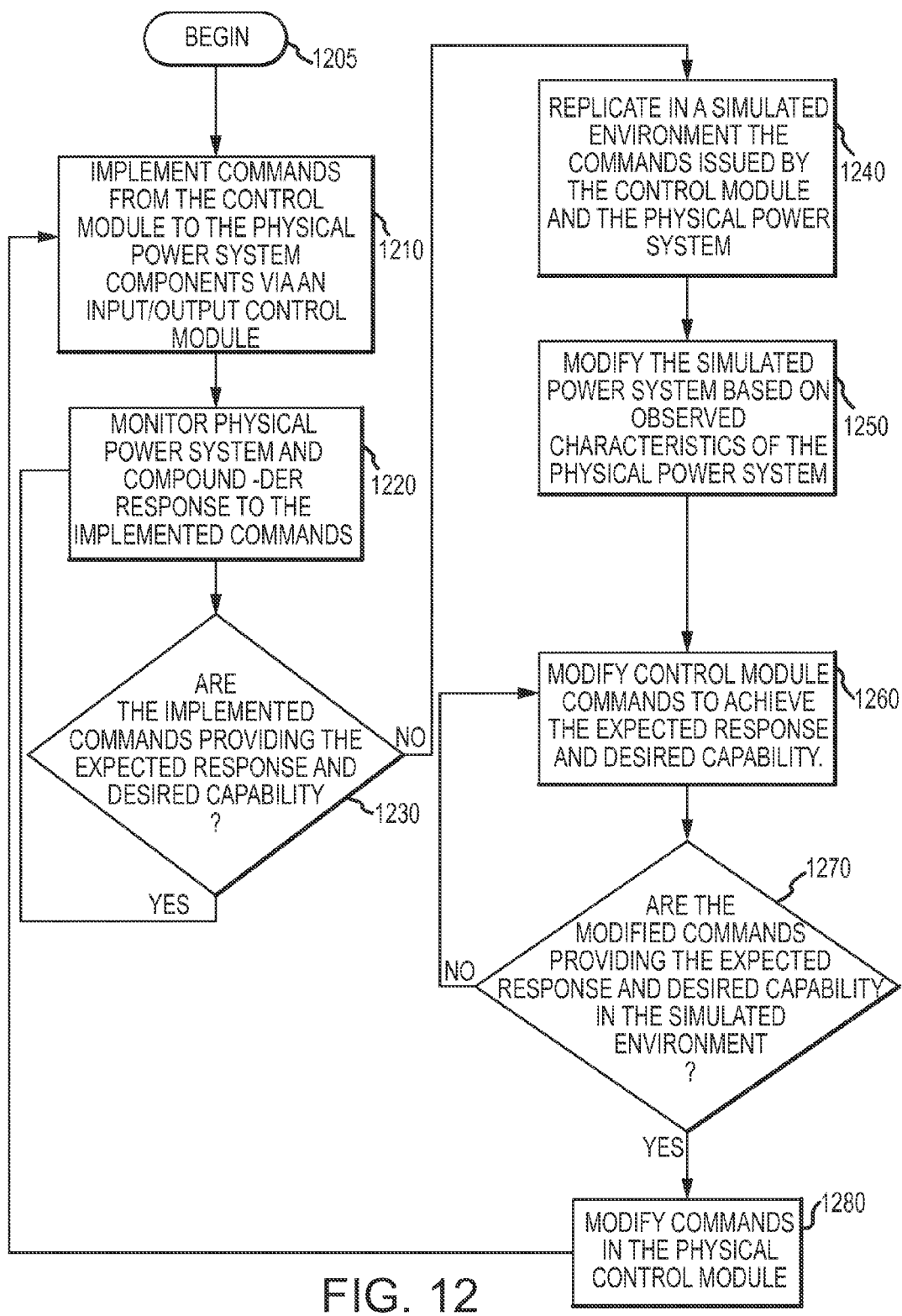
Figure 13:
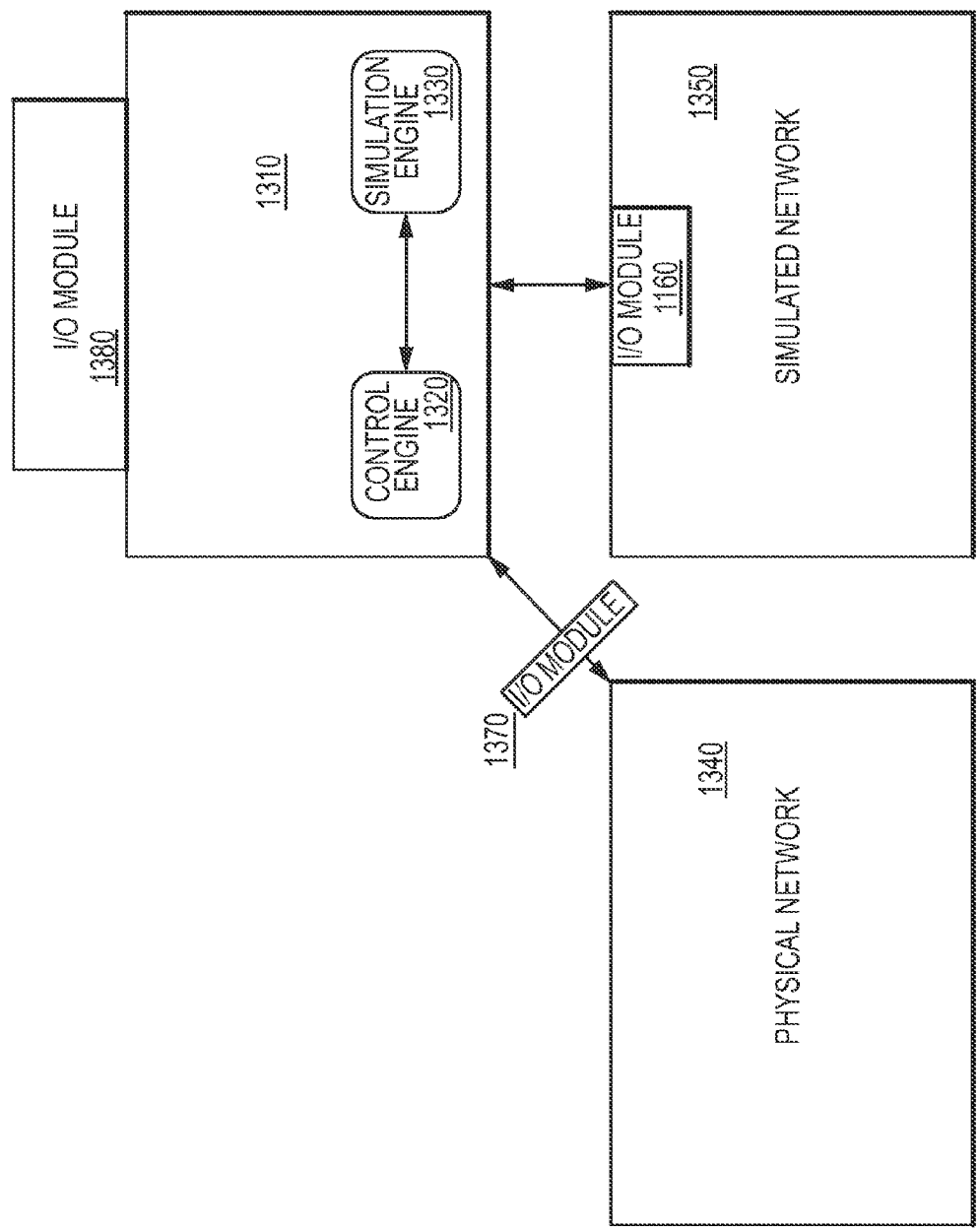

FIG. 12 is a flowchart of one method embodiment for real time monitoring and modifications of command and control inputs to a physical power system based on real time power system simulation; and FIG. 13 is a high level block diagram showing the interaction between a control module, a simulation engine and physical components of a distributed energy grid according to one embodiment of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

GLOSSARY OF TERMS

As a convenience in describing the invention herein, the following glossary of terms is provided. Because of the introductory and summary nature of this glossary, these terms must also be interpreted more precisely by the context of the Detailed Description in which they are discussed.

Cloud Computing is a paradigm of computing in which dynamically scalable and often virtualized resources are provided as a service over the Internet. Users need not have knowledge of, expertise in, or control over the technology infrastructure in the "cloud" that supports them. The term cloud is used as a metaphor for the Internet, based on how the Internet is depicted in computer network diagrams, and is an abstraction for the complex infrastructure it conceals.

HTTP (HyperText Transfer Protocol) is a communications protocol for the transfer of information on the Internet or a similar wide area network. HTTP is a request/response standard between a client and a server. A client is the end-user; the server is the web site. The client making a HTTP request—using a web browser, spider, or other end-user tool—is referred to as the user agent. The responding server—which stores or creates resources such as HTML files and images—is called the origin server. In between the user agent and the origin server may be several intermediaries, such as proxies, gateways, and tunnels. HTTP is not constrained to using TCP/IP (defined below) and its supporting layers, although this is its most popular application on the Internet.

A Web Server is a computer housing a computer program that is responsible for accepting HTTP requests from web clients, which are known as web browsers, and serving them HTTP responses along with optional data contents, which usually are web pages such as HTML documents and linked objects (images, etc.).

The Internet Protocol (IP) is a protocol used for communicating data across a packet-switched internetwork using the Internet Protocol Suite, also referred to as TCP/IP. The Internet Protocol Suite is the set of communications protocols used for the Internet and other similar networks. It is named from two of the most important protocols in it, the Transmission Control Protocol (TCP) and the Internet Protocol (IP), which were the first two networking protocols defined in this standard. Today's IP networking represents a synthesis of several developments that began to evolve in the 1960s and 1970s, namely the Internet and LANs (Local Area Networks), which emerged in the mid- to late-1980s, together with the advent of the World Wide Web in the early 1990s. The Internet Protocol Suite, like many protocol suites, may be viewed as a set of layers. Each layer solves a set of problems involving the transmission of data, and provides a well-defined service to the upper layer protocols based on using services from some lower layers. Upper layers are logically closer to the user and deal with more abstract data, relying on lower layer protocols to translate data into forms that can eventually be physically transmitted. The TCP/IP model consists of four layers (RFC 1122). From lowest to highest, these are the Link Layer, the Internet Layer, the Transport Layer, and the Application Layer.

A wide area network (WAN) is a computer network that covers a broad area (i.e., any network whose communications links cross metropolitan, regional, or national boundaries). This is in contrast with personal area networks (PANs), local area networks, campus area networks (CANs), or metropolitan area networks (MANs) which are usually limited to a room, building, campus or specific metropolitan area (e.g., a city) respectively. WANs are used to connect local area networks and other types of networks together, so that users and computers in one location can communicate with users and computers in other locations. Many WANs are built for one particular organization and are private. Others, built by Internet service providers, provide connections from an organization's local area networks to the Internet.

A local area network (LAN) is a computer network covering a small physical area, like a home, office, or small group of buildings, such as a school, or an airport. The defining characteristics of LANs, in contrast to WANs, include their usually higher data-transfer rates, smaller geographic area, and lack of a need for leased telecommunication lines.

The Internet is a global system of interconnected computer networks that use the standardized Internet Protocol Suite, serving billions of users worldwide. It is a network of networks that consists of millions of private, public, academic, business, and government networks of local to global scope that are linked by copper wires, fiber-optic cables, wireless connections, and other technologies. The Internet carries a vast array of information resources and services, most notably the inter-linked hypertext documents of the World Wide Web and the infrastructure to support electronic mail. In addition, it supports popular services such as online chat, file transfer and file sharing, gaming, commerce, social networking, publishing, video on demand, teleconferencing and telecommunications.

SCADA, or Supervisory Control and Data Acquisition refers to an industrial control system, electric grid control system or computer system used in conjunction with monitoring and controlling a process. Generally speaking, a SCADA system usually refers to a system that coordinates monitoring of sites or complexes of systems spread out over large areas. Most control actions are performed automatically by Remote Terminal Units (RTUs) or by Programmable Logic Controllers (PLCs). For purposes of the present invention, SCADA is one of the many means by which the present invention gains power consumer demand information as well as related data concerning the distributed power grid.

Distributed Energy Resources (DER) are assets, equipment, or systems capable of producing power, storing/releasing energy, managing consumption, and providing measurements and control distributed throughout a power grid. Each of the resources varies as in type and capability. Moreover a DER may represent a system composed of other DER along with portions of the electric power system operationally bound together with the control systems described in this invention (forming a compound-DER). Indeed one or more control modules and one or more DERs under operational control of those control modules can be considered, to other control modules as a DER or compound-DER. A compound-DER looks like an ordinary DER to other elements of the power system external to the compound-DER. This recursive control capability gives the current invention a powerful compositional mechanism for building and operating very large systems in a scalable manner.

OPC ((Object Linking and Embedding) for Process Control) is a software interface standard that allows Windows programs to communicate with industrial hardware devices. OPC is implemented in server/client pairs. The OPC server is a software program that converts the hardware communication protocol used by a Programmable Logic Controller (PLC) (a small industrial computer that controls one or more hardware devices) into the OPC protocol. The OPC client software is any program that needs to connect to the hardware. The OPC client uses the OPC server to get data from or send commands to the hardware. Many interface standards and protocols are available for exchanging information between applications or systems that the present invention utilizes for communicating with various DER, applications, and systems.

A Smart Grid delivers electricity from suppliers to consumers using digital technology to control energy production, consumption, storage and release, appliances at consumer's homes manage demand and/or save energy, reduce cost and increase reliability and transparency. The difference between a smart grid and a conventional grid is that pervasive communications and intelligent control are used to optimize grid operations, increase service choices, and enable active participation of multiple service providers (including energy consumers) in a complex web of dynamic energy and services transactions.

DESCRIPTION OF THE INVENTION

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

Embodiments of the present invention enable the management and control of a plurality of DER and network elements connected to a distributed power grid. Unlike traditional power grids a smart power grid allows power generation, storage, and load management within distribution networks on a local or regional level. To facilitate the generation, storage, load management and distribution of power the present invention integrates a multi-layer control system which acts to interface a plurality of diverse applications offering a variety of services to a plurality of diverse energy producing and controlling elements. Included in the description below are flowcharts depicting examples of the methodology which may be used to control and manage a transmission and distribution power grid using the capabilities of DER and systems installed within it. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture, including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

Currently, power grid systems have varying degrees of communication within control systems for their high value assets, such as in generating plants, transmission lines, substations and major energy users. In general, information flows one way, from the users and the loads they control back to the utilities. The utilities attempt to meet the demand with generators that automatically follow the load and thereafter by dispatching reserve generation. They succeed or fail to varying degrees (normal operations, brownout, rolling blackout, uncontrolled blackout). The total amount of power demand by the users can have a very wide probability distribution which requires spare generating plants to operate in a standby mode, ready to respond to the rapidly changing power usage. This grid management approach is expensive; according to one estimate the last 10% of generating capacity may be required as little as 1% of the time, and brownouts and outages can be costly to consumers.

Existing power lines in the grid were originally built using a radial model, and later connectivity was guaranteed via multiple routes, referred to as a meshed network structure. If the current flow or related effects across the network exceed the limits of any particular network element, it could fail, and the current would be shunted to other network elements, which eventually may fail also, causing a domino effect. A technique to prevent this is load shedding by a rolling blackout or voltage reduction (brownout).

Distributed generation allows individual consumers to generate power onsite, using whatever generation method they find appropriate. This allows individuals to tailor their generation directly to their load, making them independent from grid power failures. But, if a local sub-network generates more power than it is consuming, the reverse flow can raise safety and reliability issues resulting in a cascading failure of the power grid. Distributed generation can be added anywhere on the power grid but such additional energy resources need to be properly coordinated to mitigate negative impacts to the power system. Embodiments of the present invention address this need to safely and reliably control power production, distribution, storage, and consumption in a distributed power grid.

According to one embodiment of the present invention a multilayer control system is overlaid and integrated onto the existing power grid. Using data collected in conjunction with existing SCADA systems, an enterprise control module governs overall power demand, control, management and distribution. This enterprise control module interacts with regional control modules that serve to manage power production and distribution on a local or regional level. Each regional control module interfaces with multiple DER within its area of responsibility to dynamically manage power production and consumption keeping the system within its reliability and safety limits. These three layers, the enterprise control module, the regional control module and the local control module, form a distributed energy resource network operating system which acts as a stable environment to which any one of a plurality of energy producers provide energy and one from which any one of a plurality of energy consumers can draw energy. The system of the present invention enables the individual components of the power grid, energy consumers and producers, to change dynamically without detrimentally affecting the stability and reliability of the distributed power grid.

Figure 1:
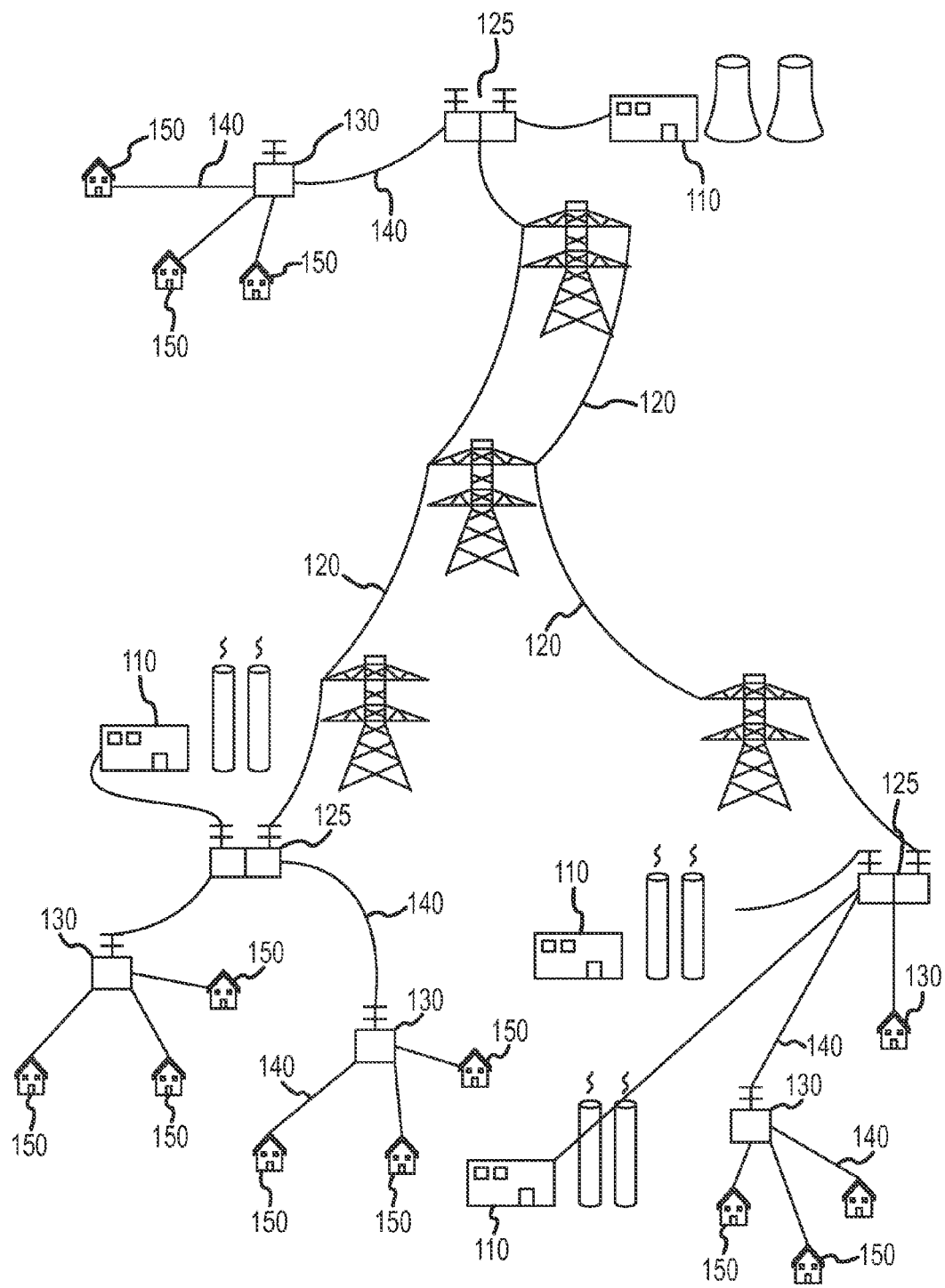
FIG. 1 shows a legacy power distribution grid as known in the prior art.
Figure 2:
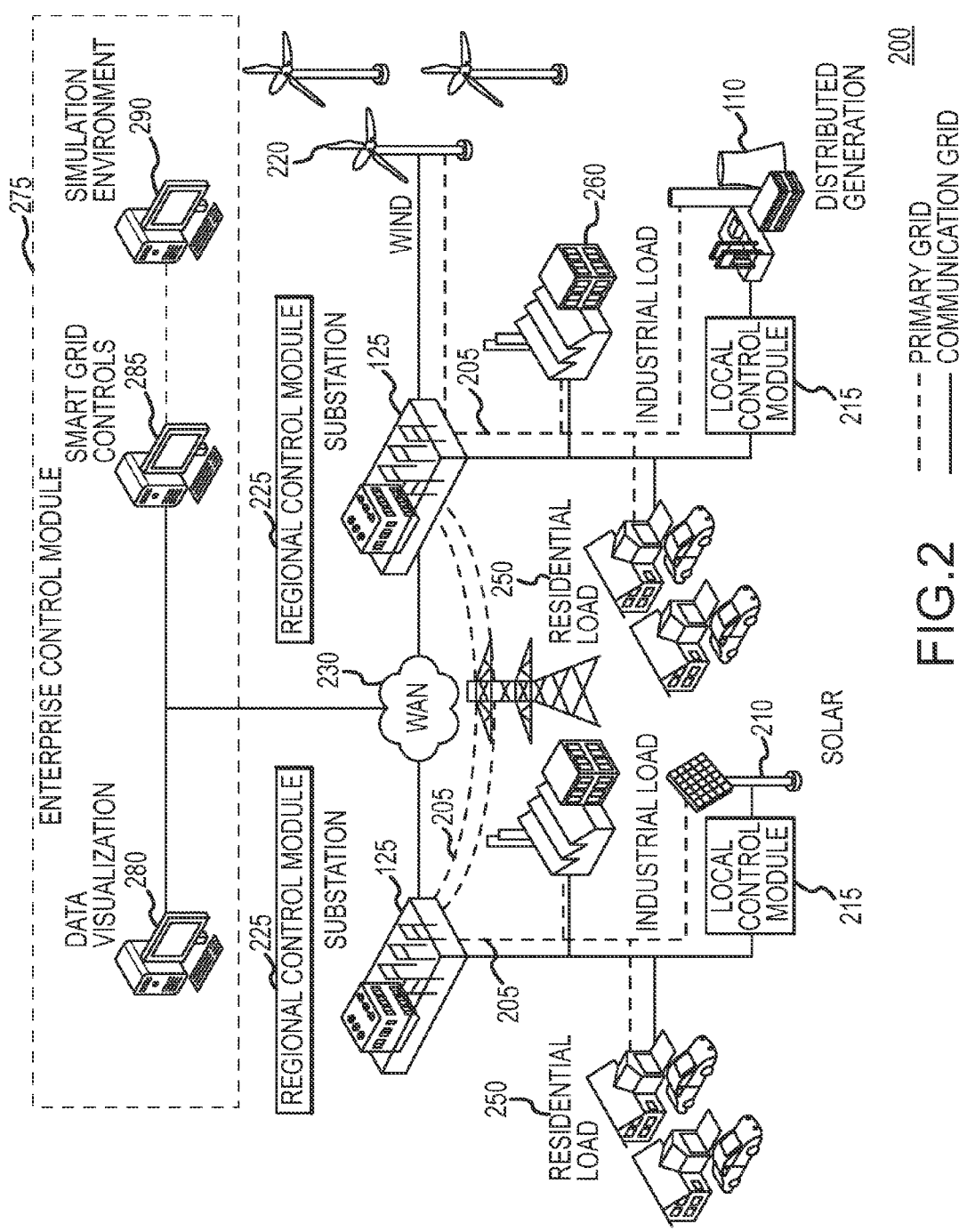
FIG. 2 shows a high level process overlay of a system for controlling a distributed power grid according to one embodiment of the present invention.

FIG. 2 shows a high level overlay of a communication system for controlling a distributed power grid according to one embodiment of the present invention. Traditional power generation facilities 110 are coupled to substations 125 as are wind turbine farms 220 and solar arrays 210. While FIG. 2 shows three forms of power generation, one skilled in the art will recognize that the present invention is applicable to any form of power generation or energy source. Indeed the present invention is equally capable of managing power added to the distributed energy grid from batteries as may be found in electric vehicles as long as the power is compatible with, or transformed to be compatible with, the grid format.

Associated with each substation 125 is a regional control module 225. The regional control module manages power production, distribution, and consumption using available DER within its region. Also associated with each region are industrial loads 260 that would be representative of large commercial enterprises and residential loads 250. According to the present invention, each regional control module using one or more applications is operable to autonomously manage the power distribution and production within its region. Autonomous operation can also be in island mode where the management of grid frequency and voltage are performed at a fast enough rate to accomplish safe grid operations. The present invention dynamically manages various modes of operation of the DER and grid to carry out these functions in addition to managing the power flows.

Each power producing entity 210, such as the traditional power generation plants 110 and the renewable or alternative energy sources 220, interfaces with the regional grid via a local control module 215. The local control module 215 standardizes control command responses with each of the plurality of power producers. By offering to the regional control module 225 a standardized response from each of the plurality of power producing entities, the regional control module can actively manage the power grid in a scalable manner. This means that the controller can dynamically alter its actions depending on the DER that is available at any time. The distributed controller dynamically and automatically compensates for assets that may be added, go out of service, fail, or lose connectivity. This capability gives the current invention a highly scalable nature minimizing the need to manually change the system every time there is a change in network structure or DER availability. This is a unique and distinguishing feature of this invention.

To better understand the versatility and scalability of the present invention, consider the following example. FIG. 2 shows a primary power grid 205 (shown in dashed lines) overlaid with a power distribution management network 200. Assume as depicted in FIG. 2 a regional control module 225 is actively managing power production, consumption and distribution of energy within its area of responsibility. To do so the regional control module 225 interacts with the enterprise control module 275 which in turn gives the regional control module 225 access to smart grid controls 285, data 280 and other management applications that are associated with the enterprise control module 275. In this example consider that the area of responsibility includes a distributed energy generation plant 110 and a wind farm electric power facility 220. Beyond interacting with these power producing facilities, the regional control module 225 is also aware of energy consumption and demand by residential loads 250 and commercial loads 260. Assume that there is no wind and thus the wind production facility 220 is idle. Accordingly the regional control module manages the distribution of energy generated by the power plant 110 and power drawn from the primary grid 205 to the various energy consumers 250, 260.

Further assume that a breeze begins to blow sufficient to power the wind turbines. One by one a plurality of wind turbines come on line and being producing power. As each wind turbine begins producing power it is identified to the regional control module 225 and indeed the entire distributed energy resource network operating system as a wind turbine having particular characteristics and properties. Knowing these characteristics and properties the regional control module can establish communication and control of the turbine as it changes its mode from idle to producing. As the wind turbine(s) can provide additional power the regional control module can decrease production requests to the power plant 110 based on its analysis of both the residential 250 and commercial 260 load and adjust the power drawn from the primary grid 205 to maintain the system within operating limits or market based contractual limits. The system also automatically adjusts other parameters such as the local spinning reserves and replacement reserves needed to adjust to the ever changing real-world conditions. This continuous adjustment across the portfolio of DER under any control module, and across control modules, is a distinguishing feature of this invention.

In doing so the regional control module 225 can modify the distribution scheme (network topology) within its region to optimize power production and distribution and to keep the system within its operational limits. Lastly assume that one of the wind turbines in the wind turbine farm 220 is of a type that is unknown to the regional control module. While producing power its characteristics, properties, and other pertinent data with respect to power production is not possessed by the regional control module. According to one embodiment of the present invention, the regional 225 and local 215 control modules send out a plurality of inquiries to the new wind turbine to ascertain data pertinent to the wind turbine's integration into the distributed power grid. This data can also be obtained through manual input by operators. Once gained, this information is shared to the enterprise control module 275 which stores the data in a repository accessible by all regional control modules. The new wind turbine is now available for active control by the system up to the permitted extent One of the methods for power generation at a traditional power plant occurs by generating steam which turns one or more steam driven turbines which thereafter drives an electrical generator. As demand increases within the region there is a finite amount of time from when the demand is realized and the new amount of energy can be produced. This sort of response is different for each type of power generation. For example, from the time an increasing demand is realized to that when power generated by a gas turbine is available, two minutes may elapse. This means the time between when the control interface issues a command to the gas turbine to begin producing power to that when the power is actually realized at the substation may be as much as five minutes or some other period of time. Alternatively, a steam powered turbine may be able to increase its output within 30 seconds, a spinning natural gas reciprocating engine may be able to increase its output in seconds and a flywheel may be able to contribute energy instantaneously. The responsiveness to control inputs of each power producing system is different. Control algorithms within the different layers of the present invention manage these distinctions so that power production dynamically meets power demand at all times. Another embodiment of the present invention standardizes responses to control inputs with respect to power generation. Knowledge of the response characteristics of DER enables the controller to reliably issue appropriate signals to produce desired results. By doing so each DER becomes the equivalent of a "plug and play" energy production device. While each DER is unique, its interface into the control management system of the present invention is standardized making the control and management of a plurality of diverse DERs possible. The information concerning the performance characteristics, operating boundaries, and other constraints of DERs and the grid are used by the various control layers to take local or regional actions without the need for a central decision making authority such as in conventional SCADA-based grid control systems. This unique approach enables the present invention to be highly scalable, rapidly respond to changing conditions and incorporate a diversity of generation, storage, and load management assets geographically dispersed within the electric power system.

As with the communication between the regional control module 225 and the enterprise control module 275, each local control module 215 provides data to the regional control module 225 regarding DER characteristics. These characteristics may include maximum output, minimum output, response time, and other characteristics as would be known to one skilled in the art. Understanding these characteristics, the regional control module 225 and the enterprise control module 275 can manage power production and distribution without risking the reliability and safety of the grid.

Consider another example in which a regional control module 225 recognizes an increase in power demand. Through the associated local control modules 215 within the region, the regional control module 225 can direct one or more additional power producers to meet this increased amount. Understanding control response of each of the power producers and their available modes of operation, the regional control module can issue commands at the appropriate time and in the appropriate sequence to meet the dynamic needs of the region. Modes of operation can be automatic load following, load sharing, frequency tracking, droop, set-point based base load generation, or any other mode available to individual DER. The ability of the regional control module to select modes of operation across its portfolio of DER enables it to respond to evolving conditions on the grid at multiple time scales. Distributed dynamic mode management across a portfolio of DER is a distinguishing feature of the current invention.

The regional control module 225 is further aware of the electricity producing capacity within the region and the limitations to the distribution grid. The regional control module 225 understands topology with respect to the power producers and power consumers and its own ability to distribute the power. Each regional control module 225 is communicatively coupled to an enterprise control module 275 via, in one embodiment of the present invention, a wide area network 230. As one skilled in the art will appreciate, a wide area network can be the Internet or other means to communicate data among remote locations. In other embodiments of the present invention data can be exchanged between the enterprise control module 275 and the regional control modules 225 via a local area network or Intranet.

According to one embodiment of the present invention, the enterprise control module 275 includes the plurality of applications to aid in the management of a distributed power grid. These applications can include, inter alia, data visualization 280, smart grid controls 285 and environment simulation 290.

The smart grid controls 285 include capabilities such as active and reactive power flow control, voltage and Voltage Amperage Reactive (VAR) control on feeders or grid interconnection points, intermittency management using various assets to counteract the variability of power generation from renewable generation sources such as wind turbines and solar panels, and optimal dispatch of generation, storage, or controllable loads to meet operations, cost, or emissions criteria.

The enterprise control module 275 is operable to manage the interaction of several regional control modules 225 and the power producers under their control. As previously described, each regional control module 225 using applicable applications can dynamically manage the power consumers and power producers within its control. As demand (active power or reactive power) within a certain region managed by a regional control module 225 increases or decreases algorithms within the regional control module act to compensate for power production within its particular region. However, it is recognized by the present invention that power consumer demand in one region may exceed the ability for that region's power producers. The presence of the enterprise control module 275 and its ability to coordinate operations of regional control modules 225 enables this type of situation to be dynamically managed by enabling production from a regional control module to serve another that does not have sufficient local resources or for any other reason. One feature of the present invention is that the enterprise control module 275 using a DER application is tasked to manage and control requests for additional power as well as the availability of excess power producing capacity. In essence, the enterprise control module provides system-level coordination, the regional control module provides regional coordination, and the local control module provides fast control of assets thereby providing smooth control over a large number of assets over different time scales and different geographic reach to meet specific system goals. This ability of the system to coordinate the operation of a dynamic and variable portfolio of DER across a dynamic and variable distribution network to keep the system within its permitted operating limits is a distinguishing feature of this invention.

The data visualization unit 280 is operable to provide a user or DER application with the current status of electricity demand, network topology and status, and power producing capacity throughout the distributed power grid. At any point in time a user can visualize the ability for power producers to provide additional power, or the particular load experienced in a region. Moreover, the data visualization module 280 can indicate to a user the availability of a path by which to distribute power. Prior to issuing a command to regional control module 225 to increase the production of electricity, the enterprise control module 275 can simulate the effects of a proposed command to test the stability of the grid under the proposed change.

The simulation environment 290, utilizing real-time data from existing regional control modules 225 and their DER facilities, can initiate a series of simulated commands to balance generation and loads. Knowing the topology of the distribution grid and the electrical properties of the elements within its range of control, the simulation module 290 can validate whether a proposed command will meet the projected load within predefined limits such as safety and regulatory constraints. The simulation module may use models of DER or compound-DER as presented to it by regional control modules to estimate the behavior of the system in near real time. It is to be noted that the regional control modules have their own simulation modules to estimate performance and plan actions within their range of control enabling distributed operations of the system. Once a proposed command has been validated using the simulation module 290, the same commands can be passed to the smart grid control module 285 for execution. This could be an automatic action or can be mediated by a human operator. This simulation module takes into account the behavior and effects of the multi-layered distributed power grid control system of the present invention deployed within the system. The ability of the simulation to take into account the behavior of the multi-layered distributed power grid control system is a distinguishing feature of this invention. Another distinguishing feature of this invention is the distributed simulation environments within the local, regional, and enterprise control modules and the ability to simulate system behavior using compound-DER presented by lower level layers.

FIGS. 3A and 3B are a high level block diagrams showing a process flow for implementing simulated (FIG. 3A) and actual (FIG. 3B) control methodology into a power system according to one embodiment of the present invention. This process flow is used for meeting different objectives. One example is during the development of the control system. The simulated power system module 340 is developed to reflect the actual power system where the distributed control system in the current invention is to be deployed. The smart grid controls module 285 is then built using local control modules 215, regional control modules 225, and enterprise control module 275 as required for the target power system. The user interface module 315 presents the operations user interface for the system as desired by various users. The control system being designed may run on the general purpose computer, the exact same hardware that will be deployed in the field, or any combination thereof. The Smart I/O module 335 will route information flow between the smart grid controls module 285 (the top level of which is the enterprise control module 275) and the simulated power system module 340. The designer or user of the system can now test the control system under development against the simulated target power system until desired performance is achieved. Another example of the process flow is shown in FIG. 3B where the smart I/O module 335 now routes information flows between the smart grid controls module 285 and the actual power system. In this example, the control system has been deployed in the field and the various control modules (local, regional, and enterprise) and communicatively coupled with field DER and with each other. A unique feature of this invention is that the distributed control system requires no modification other than appropriate addressing for field communications to operate the physical power system as designed using the simulated power system module 340. The control system also allows parameters to be fine-tuned in the field to meet system performance objectives. Yet another example use of the process flow diagrams in FIGS. 3A and 3B is during system operations. Both cases could be operational side by side, enabling operators to compare the field operations with simulated operations for planning, system reconfiguration, expansion, or troubleshooting operations. In one embodiment of the present invention the data visualization module 280 includes a user interface 315, data acquisition and management module 310 and historical data and analysis module 305. These modules work in conjunction with one another to collect and analyze data from the distributed power grid via regional control modules 225 to present to a user via the user interface 315 information with respect to the distributing grid including its status with respect to power production and power consumption. The data visualization module 280 could be exactly the same whether the control system is connected to a simulated power system or to the real power system. The interface modules between the smart grid controls module 285, simulated power system module 340, actual power system 350, and the visualization module 280 that enables the system to be seamlessly switched between these various use cases is a distinguishing feature of this invention.

Using the visualization module 280 a set of commands can be issued using the smart grid control module 285 to manage power production and distribution within the distributed power grid. Within the smart grid control module 285 exists an embedded power system simulation engine 320, a real-time control engine 325 and a real-time, intelligent control interface 335. In one embodiment of the present invention, these modules (module 285 and its component modules) are contained within the local control module 215, regional control module 225, and the enterprise control module 275 establishing the distributed control architecture of the system. For each of the modules 215, 225, and 275, the smart I/O module 335 provides the interface to the external world of DER, network components, and systems. It gives the distributed control system access to real time and non-real time data flows within the range of the visibility and control range of the individual modules. These data flows feed the activities of the real-time controls engine 325 and the embedded power system simulation engine 320. For example, say that at system configuration time a particular regional control module 225 was associated with a particular substation, all feeders below it and loads, generation, and other DER connected to the feeders through appropriate local control modules 215. At system deployment time, the smart I/O modules of the regional control module 225 and associated local control modules 215 are connected to DER and other required data sources and sinks. This portion of the power system is now within the visible and controllable range of the regional control module. During system operations, real time data flows in through smart I/O modules 335 and reach the real time controls engine 325 and embedded power system simulation engine 320, all three of which are present in their appropriate instantiations in local, regional, and enterprise control modules 215, 225, and 275. Within each of these modules, parallel activities take place where the real time controls engine uses its algorithms to determine what course of action to take to meet its local objectives. In order to accomplish this, it may query the embedded simulation engine for predictions about the consequences of actions it might take. This process may iterate until some condition is met or some time has elapsed when the controls engine 325 determines its action and sends command signals to appropriate destinations through its associated smart I/O module 325. By carrying out all these operations in parallel across the power system controlled by the distributed control system, the present invention achieves a highly scalable control solution that centralized systems cannot achieve. Further, by presenting the functional capabilities of compound-DER upstream from local control modules 215 to regional control modules 225, and from regional control modules 225 to enterprise control module 275, the system automatically manages the coordination of activities between control modules ranging from local simulations and predictions to the timing and consequences of control actions. This layered approach to synergistic operation of distributed control modules incorporating embedded power system simulation engine 320, real time controls engine 325, and smart I/O 335 for the reliable operation of power systems is a distinguishing feature of this invention.

Each of the modules within the smart grid control module 285, the real time intelligent control interface 335, embedded power system simulation engine 320 and real-time control engine 325 work together in various combinations to form the multi-layered distributed power grid control system of the present invention so as to manage and control the power grid as shown in FIG. 2.

Turning back to FIG. 3, a user (or an application running on the enterprise control module when operating in an automatic mode), recognizing the need to modify some system operating parameter, for example reduce system voltage for energy conservation, can initiate a series of commands through the smart grid control module 285 to issue the new voltage set point. The commands from the smart grid control module 285 are executed in the simulated power system environment 290 to ascertain whether the proposed solution will meet the voltage reduction objective under the then current conditions on the grid. In essence the multi-layered distributed power grid control system of the present invention provides real-time actual data with respect to the current grid topology and energy producers as well as real-time data regarding energy consumption to a simulation engine which then carries out one or more simulations of proposed solutions to meet system performance objectives.

Once a series of simulations has been validated by the environment simulation module 290, the grid control strategy can be applied to the actual power system 350 without fear that the alteration in the grid will adversely affect the grid's stability. This is accomplished by sending the commands from the data management and visualization module 280, to the multilayered distributed power grid control system 285 installed in the field that is in turn connected to the physical grid and devices 350, instead of the simulated grid and assets 290. During application of the actual commands to the actual power system 350, data is once again acquired through the data acquisition and management module 310 to verify that the commands issued are producing the desired results. The ability of the system to evaluate the behavior of the multilayered distributed power grid control system 285 in simulation and then to deploy it directly to the field (with very minimal modifications such as device addressing) is one of the distinguishing features of the present invention.

Managerial applications operating on the enterprise layer 275 can initiate commands to one or more of the regional control modules 225 to increase power production and transfer power among the variety of regions within the distributed power grid. For example, consider a region managed and controlled by a regional control module 225 that is experiencing an increase in power demand or load. This increase in demand may be the result of an unusually high temperature day resulting in increased air-conditioner use or the increase may be expected during working hours due to a high concentration of the industry located within the region. The regional control module 225 in conjunction and in communication with the enterprise control module 275 can predict and recognize this load increase using peak load management, demand response, or other DER management applications. The regional control module 225 can further recognize that the power producers within the region are incapable of producing enough power to meet the demand or their ability to produce such power would exceed safety and regulatory constraints.

Upon recognizing that such a situation may occur the regional control module 225 issues a request for additional power through the enterprise control module 275. Applications associated with the enterprise control module 275 issue queries to the remaining regional control modules 225 regarding their ability to produce excess power. Other regional control modules 225 can respond to the inquiry indicating that it has the ability to increase power production in response to the request for power by another region.

Understanding that one region has an excess capacity of power and another has a need for additional power, as well as knowing the topology of the distributed power grid, applications associated with the enterprise control module 275 can run a series of simulated controls to increase power production of a first region and transfer the excess power to a second region. Once the commands have been validated, the commands are issued by the smart grid control module 285 to both of the affected regional control modules 225; i.e., the region having an excess power capacity and the regional control module 225 of the region requesting power. Furthermore, a distribution application can configure switches throughout the distributed power grid to transfer power from the first region to the second region.

The request for power from one region and the response with excess power from another, as managed by one or more applications affiliated with the enterprise control module 275, is a dynamic process. One skilled in the relevant art will recognize that the consumption of electricity within a particular region varies dynamically, as does the ability of any region to produce power. While historical data can provide insight regarding typical loads experienced by one or more regions, as well as the ability of another region to produce excess power, the production and transfer of power must be controlled dynamically and in real-time. Within the multilayered distributed power grid control system of the present invention, different power management functions are carried out by the different layers. The ability to "look-ahead" to make decisions about what actions to take using simulations exist at every level. This is a feature of the distributed controller—not all decisions have to be made at the enterprise level. This is also true for the simulations—many simulations are carried out at the regional controller level, while systems level simulations may be carried out at the enterprise level. In essence, simulations necessary for real-time control are carried out automatically at the appropriate control layer, simulations to provide operators with options that they may have under various operations situations is carried out at the enterprise level.

FIG. 4 is a high level functional block diagram of a distributed energy resource network operating system for power production, demand management, topology management, and DER or asset management according to another embodiment of the present invention. A Distributed Energy Resource Network Operating System (DER-NOS) 410 is interposed between a plurality of management applications and a variety of energy producing resources. According to one embodiment of the present invention, the DER-NOS interfaces with a variety of power producing resources using a gateway or interface (local control module) 445. The gateway 445 is an interface that issues commands in the correct order, sequence and format for a particular device. This interface translates standards commands for different classes of equipment, assets, or DER to the unique commands required by different makes and models of equipment. The interface ensures that as far as the smart grid controls 285 are concerned, each device operates in the same manner from manufacturer to manufacturer. This gateway 445 also runs the lowest layer of the multilayered distributed power grid control system. In this example, the DER-NOS consistently interacts with DER such as photovoltaic cells 440, conventional power generation plants 430, mixed fuel generation capabilities 420, renewable generation resources 415 and the like. It is also capable of managing additional assets such as storage devices or load management systems. The DER-NOS has the ability to manage and control a variety of power producing, storing, and consuming resources utilizing a variety of application tools.

According to one embodiment of the present invention, distributed energy resources can be managed and controlled using application modules including inter alia peak load management 465, distributed generation applications 460, demand response applications 455, and other DER-NOS monitoring applications 450. Each of these management and control tools interact via an engineering workstation or web based user interface either through computers or mobile devices to assist a user in deploying the system and to understand and manage the operation of the power network and network-connected distributed energy resources throughout the power grid. This management and control is accomplished via the DER-NOS. One skilled in the relevant art will recognize that the engineering workstation 475 interacts, in one embodiment, with a data visualization model 280 as described with respect to FIG. 2. This engineering workstation enables the system to be configured to match field conditions.

FIG. 4 further shows an interaction between the engineering work station 475 and the monitoring application 450 via a modeling simulation module, also referred to herein as the simulation module 290. The monitoring application provides real time data to the simulation module that in turn is used to configure and tune the system. This ability of the system to utilize real time data from the field to carry out simulations to further tune the system in an integrated manner distinguishes the current invention from the prior art.

The DER-NOS interacts with a variety of management applications 465, 460, 455, 450 and the energy producing resources 440, 430, 420, 415 and automatically carries out power management 480, topology management 485 and energy resource asset (DER) management 490. This management is accomplished, according to one embodiment of the present invention, using a three layer operating system acting as a bridge between the management applications on one hand and the distributed energy resources on the other. Without the DER-NOS of the present invention, each management and control application would have to develop custom methods to gain data, interface with each DER, and send unique instructions to operate DER while leaving unsolved the issue of grid impact mitigation, conflicting operations between DER, and coordination for achieving system-wide objectives. The DER-NOS is a common platform for all DER, network, and power management applications to use. For example, according to one embodiment of the present invention, the distributed generation application 460 does not need to know what specific commands must be issued to cause a particular type of steam power electrical generator to increase production. It simply issues an instruction that the plant should increase production and the DER-NOS converts the command to a format that the steam power electrical generator will recognize. Further, the DER-NOS also carries out "aggregation" and "virtualization" of DER. Aggregation is the process of dynamically pooling different DERs into groups based on user or application specified criteria. The combined capabilities of the DER in the pool and operations that can be performed on the pool are calculated by the DER-NOS. A command issued to an aggregate resource by a user or application will be transparently interpreted and executed appropriately by the DER-NOS. The DER-NOS can also bind aggregate resources and the network that connects them into "virtual" resources using appropriate local and regional control modules 215 and 225. Virtual resources (same as compound-DER described earlier) can be treated as a single DER by other parts of the system. These "virtual" resources (with capabilities comparable to a conventional power plant or other DER) are now made available to the variety of management applications 465, 460, 455, 450. Availability, compatibility, assignment to pools and/or applications, conflict resolution, error handling and other resource management functions are carried out by the DER-NOS, much as a computer operating system assigns memory, processor time, and peripheral devices to applications. The ability of the present system to manage resources and make them available individually, in pools, or as virtualized resources to applications for optimally utilizing them for various functions is a significant advantage over prior systems.

FIG. 5 is a high level block diagram of a multilayered architecture for controlling a distributed power grid showing an expanded view of one embodiment of a DER-NOS according to the present invention. As shown in FIG. 5, the DER-NOS includes a multilayered approach having local control modules 510, regional control modules 520, and an enterprise control module 530. The enterprise control module 530 is communicatively coupled to each of a plurality of regional control modules 520 and each regional control module 520 is communicatively coupled to a plurality of local control modules 510. The DER-NOS interacts with external applications and devices through custom interfaces 545, 555, and 565. Through these interfaces the DER-NOS gains the ability to interact with existing DER assets, grid equipment, utility SCADA systems, and other applications to exchange data and control commands. These custom interfaces serve as adapters to translate implementation specific interfaces to the common language used within the system.

The DER-NOS 410 is linked to a variety of management applications 580 as previously shown in FIG. 4. Each of the plurality of management applications 580 is linked to the DER-NOS 410 by an OPC server 531. The enterprise control module 530 and the regional control module 520 both include OPC client/servers 535 to aid in the communication between the DER-NOS 410 and the plurality of management applications 580. As will be understood by one of ordinary skill in the relevant art, utilization of OPC is but one of many means to implement a communication interface. Many other such interfaces that are both reliable and fast can be utilized in conjunction with the present invention without departing from the scope of the inventive material. The enterprise control module 530 uses, in this embodiment, an object model for each asset type within the DER-NOS. The object model not only defines the input and output to a particular asset such as a DER, but also defines the control/system response of changes in commands issued to the asset. Ensuring that an asset responds in a similar manner to a command provides the enterprise control module the ability to maintain stable and repeatable control architecture. For example, if two generators responded differently to an "OFF" command, the complexity of implementing controls would be difficult as the area under control expands, and the number of varying assets increases. Using a common object information model resolves this dilemma by providing both common information and controls. These common object models are implemented primarily at each local control module 510, based on common object model definitions, and then propagated throughout the system. This approach ensures that the system can interface with any asset in the field regardless of manufacturer or site-specific customization and still have a common object model representing it. The mapping from site, asset, and implementation specific details to a common object model is carried out by the local control module 510.

The enterprise control module 530 is also linked to existing supervisory control and data acquisition systems 540 through a custom interface. Through these systems and with additional data from each regional control module 520, the control unit 530 monitors and controls data points and devices through existing SCADA systems and DER-NOS-specific control modules. As will be understood by one of ordinary skill in the relevant art, SCADA is but one of many means to implement supervisory control systems. The custom interface 545 can be used to interface with any required external application.

According to one embodiment of the present invention, the enterprise control module 530 includes a network topology module 532, controls 533 by which to manage the regional control modules 520 and distributed energy resources 560, a dynamic configuration change handler 535, a regional control module interface handler 536 and an input/output interface manager 538. Regional control modules 520 each include a network topology module 532, controls 533 to manage the distributed energy resources within its region, a dynamic configuration change handler 535, a local control module interface handler 525 and an input/output interface manager 538.

Each local control module 510 includes controls 533 by which to manage distributed energy resources using the asset interface handler 515. The local control module 510 also includes and OPC client 534, a dynamic configuration change handler 535 and an input/output interface manager 538. The local control module 510 interacts directly with the power resources (also known herein as Distributed Energy Resources or DERs) 560 and measurement systems through a custom interface 565. The regional control module 520 interacts with field systems 550 and/or subsystem controllers/applications through its custom interface 555. These three layers of the DER-NOS 410 work together with management applications 580 to dynamically manage and control a distributed power grid.

As can be appreciated by one skilled in the relevant art, knowing the network topology is a critical aspect of managing the distributed power grid. The network topology module 532 supports network topology analysis queries which can be integrated into a particular control to enhance the control range/capability. Network topology is the representation of the connectivity between the various elements of the electric power system (transformers, busbars, breakers, feeders, etc) and the DER that is connected to it. DER-NOS uses this subsystem to ensure that future controls can be safely performed while limiting the risk to the stability of the grid. This is accomplished by running load flow calculations and dynamic simulations to predict the future state of the system based on proposed control actions and evaluating whether the resulting state violates any stability, reliability, or operations criteria of the network. The network topology module 532 subsystem can also receive dynamic status updates of the electrical network from a variety of data sources. This allows the network topology module to be updated with the latest information about the state of the "real" system so that predictions can be made with the most recent information available.

The network topology module 532 associated with the enterprise control module 530 can issue queries to the regional control module 520 and wait for results. The regional control module 520 uses its own network topology module 532 and control algorithms to compute results for queries from enterprise control module 530. In this way, the enterprise control module 530 does not need to analyze the entire network itself, but rather distributes the analysis to the regional control modules 520. This process may be carried using a request-response method or by having the regional control module 520 push information to the enterprise control module 530 on a periodic or event triggered basis. The net result is that the network topology module, simulation modules, and other modules within higher layer control modules has access to pre-processed information from lower layer control modules minimizing the real time data they need and the processing they have to do.

The control subsystem 533 associated with the local control module 510 de-codes commands provided from the regional control module 520 directed at power resources 560. The controls subsystem 533 ensures that the targeted asset responds consistently and reliably. This operation translates the common object model based commands used within the system to the site, equipment, and implementation specific commands required to operate the DER 560.

The input/output interface manager 538 provides an interface management system to handle remote communications between the enterprise control module 530 and external systems such as SCADA systems and other enterprise applications. Within the regional control module 520, the input/output interface manager 538 handles remote communications with field devices and systems and subsystems 550 and provides the ability to exchange information and control signals with external devices (distributed energy resources, meters, etc). These input/output interface modules 538, the regional control module interface 536, local control module interface 525, and the asset interface handler 515 enable the system to map external data points, devices, and systems to the common object models used within the system to ensure consistency and reliability between the data used in each subsystem.

Field systems or subsystem controllers and applications 550 is any system external to DER-NOS that the regional control module 520 has to exchange data and control signals with. Example would be a switch (breaker) at a substation.

The dynamic configuration change handler 535, found in each module is the engine that accepts field signals, information from other systems such as utility SCADA, or user inputs and responds to changes in the configuration of the network (network topology), availability of assets, or communications system changes by making internal changes to appropriate parts of the system. Since the DER-NOS is a distributed controller as previously described, the dynamic configuration handler 535 is the engine that ensures that real time change information propagates appropriately throughout the system (without having to shutdown and restart the system) and various resources (DER and grid assets) are put into new modes of operation dynamically.

Typically the local control module 510 only interacts with single devices or a small group of directly connected devices at a single site. Hence it does not require the more sophisticated dynamic configuration manager 535 that deals with configuration changes across multiple devices/sites that are geographically dispersed. The controls at the local control module 533 have the capability to manage configuration changes as required for the devices to which the local control module 510 is connected.

FIG. 6 is a flowchart depicting local control module logical operations according to one embodiment of the present invention. Each layer of the DER-NOS 410 architecture operates independent of the other layers such that if and when communications are lost between layers or other subsystems fail, each control module can continue to operate in a failsafe mode until other systems come back on-line or until pre-programmed sequences, such as a shut down sequence, are triggered.

The local control module operates by carrying out operations based on a prior system state 610. From that state the local control module updates 620 the status of each connected DER as well as local grid conditions and other local constraints on the system. Next an update request is sent 650 from the local control module to the regional control module. Pending updates are received and thereafter the local control module determines the next actions to be taken and/or response to be sent to the regional control module 670. From that point the local control module carries out 680 one or more actions and updates the regional control module with respect to these actions. Request and response processing between local, regional, and enterprise modules are asynchronous in the sense that the modules do not wait pending the arrival of a response message. They are designed to continue operations without locking on delayed or failed communications between control modules.

FIG. 7 is a flowchart depicting the operational logic of a regional control module. As with the local control module, the regional control module carries out actions based on a prior system state 710. The regional control modules receives information from and updates the status of each connected local control module 720 as well as the network status from SCADA and/or subsystem controllers. Grid measurements within the region of responsibility as well as monitored events are also updated. Armed with the knowledge of the status of the local control modules under supervision, the regional control module requests 740 updates from the enterprise control module including the objective the regional control module should be satisfying.

The regional control thereafter determines a next course of action 760 to meet these objectives. In doing so the regional control modules evaluates 770 the consequences of each proposed action using local simulation and local intelligent algorithms as described below in reference to FIG. 10. Alternate actions are also considered 780 until a final set of actions or warnings are determined. Lastly the regional control module carries out 790 the determined set of actions and sends a response to the enterprise control module informing it of these actions as well as commands to the applicable local control modules.

Finally FIG. 8 is a flowchart depicting the logical operation of an enterprise control module according to one embodiment of the present invention. Again the enterprise control module carries out its actions based on the prior state of the system 810. As the overall governing entity the enterprise control module updates 820 the status of connected regional control modules, enterprise applications and other enterprise assets with which it interacts. System status updates are also sent out 850 to the presentation subsystem that is used to update the user (human) interface system. Likewise the user interface can be used to receive user inputs when provided.

The enterprise control module thereafter determines what action to take next 870 by evaluating the consequences of various actions by conducting global simulations using intelligent algorithms. Enterprise control module simulations operate on compound-DER or virtual DER provided by regional control modules. The dynamic behavior, performance characteristics, and measurement and control interfaces of compound-DER are calculated and presented to the enterprise control module by regional control modules. Simulations at the enterprise control module level are therefore able to characterize the global behavior of the system without having to model all the details of all distributed resources and grid components. Alternate actions are considered 880 until a final acceptable set of actions or warnings is determined. Once determined the enterprise control module then executes 890 these actions and sends out response and commands and new commands to the connected regional control modules.

FIG. 9 is a flowchart of one method embodiment for managing power distribution and production in a distributed power grid according to the present invention. As will be appreciated by one skilled in the relevant art, the control and management of distributed energy resources using a network operating system can include among other things allocation of energy production, modification of network topology, energy storage allocations, load management, and simulations. FIG. 9 shows one method example of a reallocation of power resources in a distributed power grid. One skilled in the art will recognize that this method example is representative of the interactions between various DER management applications and energy resources via a DER-NOS and is not limiting in the scope or capabilities of the DER-NOS.

According to one embodiment of the present invention, management applications operating through an enterprise control module conducts predictive power system analysis based on projected power production and power consumption 910. As the power system analysis is conducted actual power production and consumption is monitored within each regional control module 920. In addition, network topology is analyzed as well as network connectivity 930.

Upon receiving 940 at the enterprise control module a request for additional power, a demand response application of the enterprise control module identifies one or more regions having excess power production capacity 950. Thereafter the management application determines a proposed reallocation of power production resources and network connectivity modifications to meet the received request 960.

A simulation of the proposed reallocation of power production resources is initiated along with simulations of connectivity changes in the distributed grid 970. Responsive to the results of the simulation meeting predefined constraints, the control application constructs a series of commands to direct the proposed power reallocation 980.

With the proposed reallocation of power production resources validated, the management application and control application directly send via the enterprise control module commands 990 to the applicable regional control modules. Upon receiving the reallocation commands, the regional control module issues power production commands to power producers within its applicable region and/or modifies its network topology to distribute the excess power to meet the load request of other regions. While simulations are used at different levels within the distributed control system, real feedback from field systems at multiple time scales ensures that simulation errors do not result in runaway errors during operations. In effect, the real world provides a continuous cross check for simulation results. The control modules take this effect into account to mitigate the consequences of potential simulation errors.

FIG. 10 is a flowchart of one method embodiment of the present invention for simulating a power system reflective of a portion of an actual power distribution grid (compound-DER). As previously mentioned, one aspect of the present invention includes the capability to simulate a physical power distribution grid and its associated control system so as to determine and validate control inputs prior to actual implementation. The present invention provides the ability to externally simulate the characteristics and capability of a power system in response to a particular set of control inputs prior to actual deployment of those controls. During the deployment phase (shown in more detail with reference to FIG. 11) the controls and simulated power system are validated and modified to achieve a desired result. Finally as the controls are used to operate the power system real-time monitoring of the power system responses enables the present invention to run parallel simulations of the power system at a local level to tune the control inputs to precisely achieve the desired results. The present invention provides the ability to simulate and reflect a current distribution power grid and virtually test various control inputs so as to determine the characteristics and capabilities of the grid both prior to and during implementation of those controls.

One aspect of the present invention, as illustrated in the process of FIG. 11, is its ability to externally simulate the behavior, response, and characteristics of individual components as well as how a plurality of these components interacts to form a simulated system response. This simulation of power components includes an overlay of local, regional and enterprise control systems. This insight into the capability of a compound-DER can be passed upstream to other control modules which can then use that information as a basis for its own simulation and control process.

By using the ability to group power system components into compound-DER and simulate the characteristics, responses and capabilities of this compound-DER locally, the present invention can provide a robust, accurate and real-time simulation of distributed power grid to be used to modify control inputs on a real time basis and achieve a desired objective. Unlike a global simulation of a distributed power grid each simulation occurs locally and is independent of other simulations. However downstream simulations provide information to upstream control modules, and thus their simulation engines, with respect to the capabilities and response characteristics of the downstream compound-DER. To an upstream control module, downstream compound-DER is simply another power system component with specific characteristics. This type of simulation process enables the present invention to scale a simulation of the entire distributed power grid both quickly and accurately.

Turning attention back to FIG. 10, an internal or external simulation process begins 1005 with the development 1010 of a simulated power system. This simulated power system reflects, in one embodiment of the present invention, a portion of the distribution power grid along with its overlying control system. By doing so a compound-DER representation can be presented to the simulation engine which can in turn determine the compound-DER's capabilities.

With the simulated power system developed, a control module is constructed 1020 using local, regional and enterprise controls as required. These control inputs represent the various methodologies used to control the various physical components, their interfaces and their interactions as represented in the simulated topology. The controls inputs used are identical to those which would be used to control the corresponding components in the physical power system.

Having the power system represented and the tools to implement changes to that system in place, a simulation can be run based on a local system power objective 1030. According to one embodiment of the present invention a system objective with respect to the simulated power system is received and forwarded to the simulation engine for evaluation. The simulation engine determines whether the current compound-DER has the capacity and capability to meet the request.

To do so the control module iteratively tests 1050 various control inputs sent to each of the components in the simulated power system to identify predictions regarding various control actions. Each time a particular combination of control inputs are forwarded for evaluation, a query takes place asking whether the desired objectives have been met 1060. When the answer to the query is no, a new iteration takes place with new, revised control inputs. The selection of the control inputs and the iterative process is conducted according to simulation models as would be known to one skilled in the relative art.

When a selected control input has been found to achieve the desired result, the controls are deployed 1070 to the physical power system for implementation. There the controls are validated to ensure that the proposed combination of command inputs to the various DER components can operate within the design parameters of each component and of the grid itself to achieve the desired result.

FIGS. 11A and 11B combine to form a flowchart showing one method embodiment for deploying a simulated set of control inputs to a physical power system. The process begins 1105 with receiving commands developed by an external simulation or similar process. These commands are implemented 1110 on the physical power system via the control module.

As the power system receives the commands its response is monitored 1115 and evaluated to determine whether the implemented commands are providing the expected outcome and desired capabilities 1120. When the commands are producing the desired outcome consistent with the simulation operational control of the compound-DER is established 1125 enabling a user to actively engage with the power system.

This select combination of command inputs is thereafter passed upstream 1130 to other control modules and simulation engines that can use this information to perform other simulations, albeit at a higher scale of representation. For example a current simulation involving 4 physical components and two local control systems and a single regional control system can be deemed a single DER in an enterprise level simulation. For the purpose of that enterprise simulation the local simulation engine only considers these components as a single DER with specific characteristics and capabilities as conveyed from below.

When the response of the physical power system to the simulated commands is not as expected a determination must be made as to whether the controls themselves or the simulated power system is to blame for the inaccuracy. To make such a determination during the deployment phase the control commands are switched 1140 from the physical power system to the simulated power system. Again the characteristics and response of the now simulated power system is monitored to determine if the control used on the physical power system produce the same, albeit unacceptable, responses. If the responses to the same control inputs observed from the simulated power system do not match those observed from the physical power system it can be concluded that the simulation of the power system itself is inaccurate. Accordingly updates are received 1155 from the physical power system to the simulation engine to modify 1160 the simulated power system characteristics. Then with a new, more accurate, simulated power system in place the control inputs can be again used in the simulation to determine if the results gained from the physical power system match those in the simulation.

If the results of the two power systems, simulated and physical, match a conclusion can be reached that the inability of the physical system to respond as desired and anticipated is due to deficiencies in the commands issued by the control module. Accordingly the simulation modifies 1170 the commands issued by the control module and again queries whether the control module information flow (now modified) produces the desired objectives from the simulated power system 1180. If not new command modification are initiated iteratively until the desired objectives are achieved. Once the objectives are met the control module information flow is switched 1190 from the simulated power system back to the physical power system. Again the controls are implemented on the physical power system with the responses monitored 1115. If the modifications to the simulated power system and/or commands are sufficient the desired results seen in the simulation will be achieved in the physical power system. Once the commands are validated as producing the desired result operational control of the power system is established 1125 and the capabilities/characteristics of the now implemented compound-DER is conveyed upstream for control module coordination.

FIG. 12 presents a flowchart of one embodiment of a methodology for real-time monitoring and command modification of a distributed power system. After a control system has been simulated, deployed and validated it is placed into an operational mode. At this stage a user can interact with the control module as required to gain information about and manage the power system under its control. According to one embodiment of the present invention the commands issued by the control module are constantly monitored and adjusted to ensure the power system under its charge meets its desired objective. In doing so the commands developed under simulation and validated on the power system are implemented 1210 by the control module via an input/output interface or module.

As the commands are conveyed the response of the various components of the power system are monitored 1220 as is the overall characteristics of the power system (compound-DER) as a whole. From the monitored data the control module determines whether the power system under its charge is providing the response and characteristics as expected and desired 1230. When the power system operates as expected the system simply continues to monitor 1220 performance until a new objective is received.

However, during this operational stage, when the performance of the power system under its control does not operate as expected or fails to produce the desired results a local simulation of the control system and power system itself is replicated 1240 in parallel to the operation of the physical power system. As one skilled in the art will appreciated once the control module is placed in an operational mode it cannot be simply switched off to modify the issued commands as during the deployment phase. While a deficiency in the characteristics or response of the power system has been identified it must remain operational.

According to one embodiment of the present invention the physical power system continues to operate under the existing control module using existing commands while a new simulated control module and simulated power system is used to explore minor changes in the commands so as to fine tune the response of the power system components and the compound-DER in general. While the physical power system continues to operate the simulated power system modifies 1250 its structure to more accurately match that of the physical system. These modifications are based on observed variances in the characteristics of the physical system as compared to the simulated system. These variances can occur on a real time basis and may have not been anticipated by the prior simulations. Nonetheless the variances are incorporated into the simulated power system model on a real time basis to make the simulation as accurate as possible.

With the power system accurately simulated and updated on a real time basis the controls issued by the control modules are modified 1260 to achieve the desired compound DER response. With each modification to the controls, a query 1270 occurs to determine whether the response meets the desired objective. When the response falls short of the objective other modifications 1260 occur iteratively each followed by another inquiry until the objective is satisfied. Once the objective has been satisfied, the new set of commands from the simulated control module is used as the basis to modify 1280 the commands on the physical control module. Thereafter the physical control module implements 1210 the revised commands and the response of the physical power system monitored 1220.

The operational monitoring of the physical system as well as replication and simulation of both the control module and compound-DER continues concurrently so that as minor changes to the physical system occur, or as inaccuracies in the previous command set are identified, corrective action can be identified and taken immediately. By doing so the control of the compound-DER is fine tuned as is the ability to report upstream an accurate depiction of the capability and characteristics of the compound-DER under its charge.

To better understand how the simulation processes assists in developing a robust, scalable and accurate control system, consider the following example. FIG. 13 shows a high level abstract view of a control module 1310 as would be part of either a local, regional or enterprise control system according to one embodiment of the present invention. As previously described, each control module 1310 includes a control engine 1320 and a simulation engine 1330.

For the present example assume that the physical network 1340 of a region of interest includes a wind power turbine farm, a coal fire power generation plant, and a factory which acts as a load on the regional bus. Also associated with these components are various substations, transformers and transmission lines. These three DER components are grouped together and overlaid with a local control system that communicates with the regional control module to form a compound-DER. Each component also has an individual control and monitoring unit specific for that component. For example each wind turbine would possess a control unit that can issue commands and provide data with respect to that individual wind turbine as well as an overall control and monitoring unit for the farm itself. Likewise the power generation plant possesses controls for running the generators within the plant. And undoubtedly the load possesses certain characteristics with respect to power usage. On top of these component control units is an integrated control module that integrates each of these components into a single power system. These systems, the components, transmission lines, substations and control infrastructure join to form, for the purpose of this simulation a single compound-DER system.

To develop the controls necessary to control such a system as described above the entire physical power system is simulated by the simulation engine 1330 to form a simulated network 1350. This simulated network is a virtual representation of the joint characteristics of each individual component merged with the characteristics of the grid and its control infrastructure. The control engine 1320 possesses the control inputs which it can utilize to modify/control the behavior of each component within the system and thus control the compound-DER itself.

Consider in this example that the wind turbine farm has the capacity to output up to 10 MW of power during the afternoon hours when wind is prevalent but realistically can only reliably produce 3 MW from 6 AM to Noon. The power generation plant can generate 15 MW of power but power generation above 10 MW is costly and requires significant advance notice to spin up additional generators. Finally the load various throughout the work day from 2-5 MW, peaking during the afternoon hours.

According to one embodiment of the present invention and in consideration of the present example, a request arrives that the interface 1380 between the current and an upstream control module seeking 10 MW of power from the downstream power system between the hours of 10 AM and 2 PM. Before issuing a response to the requesting control module with respect to its ability to deliver on such a request and before issuing commands to the physical components in an attempt to produce power for such a demand, the control module 1310 directs the simulation engine 1330 to determine whether meeting such a request is feasible and if so, what commands must be issued to the physical components to produce such excess power.

The simulation engine 1310 using the developed simulated power system 1150, known characteristics of the components, and commands available from the control engine 1320, conducts an external simulation by running iterations of various control inputs and environmental constraints to determine whether the compound-DER under its charge can produce an excess 10 MW of power within the required standards from the hours of 10 AM to Noon. The simulated power system of the compound-DER may, in this case, normally only produce an excess of 8 MW during the hours of 10 AM to Noon. And to provide to an upstream control module 10 MW of power during the hours requested specific commands would have to be issued to generate additional power and possibly limit the load. For example an extra generator at the power plant may have to be initiated as well as additional wind turbines brought on line.

The ability of the power system to meet the demand can then be conveyed back to the requesting control module. When it is deemed that the commands and simulation are valid and acceptable the control engine can then deploy the exact and validated commands to direct the physical network 1350 to produce an excess of 10 MW of power as requested. During deployment the commands are implemented and the physical power system characteristics monitored to validate both the simulation of the power system and the developed commands. If necessary modifications are made to both the commands and the simulation.

Upon operational implementation the control module monitors the actual conditions and notes, perhaps, that less power than normal is being produced by the wind turbines, a new simulation can be run in parallel to determine what new commands must be issued or existing commands modified to maintain the power to the upstream control module as requested. Should the simulation determine that it can no longer produce 10 MW of excess power; a message can be conveyed to the upstream control module of that deficit. The present invention thus considers, simulates and controls not only the individual components of a distributed power grid but how these components interact.

One aspect of the present invention is its ability to scale the simulation process from a local power system environment to the entire distributed power grid. As a power system is simulated and commands are developed for its control, as illustrated in the example above, information is gained with respect to that power system's ability to provide a certain capacity. The characteristics of the power system as a whole are determined and from the perspective of an upstream control module a downstream compound-DER comprised of several different components, transmission lines, substations and other infrastructure, is but a single component with specific characteristics. That upstream command module can then use that information to characterize the power system as but one component: a compound-DER. That upstream simulation and command system development occurs in the same manner and, like in the downstream module, can be modified in real time. Thus as the characteristics of one of its components change (the downstream compound-DER) the upstream power system control module and simulation can be modified. This form of distributed simulation and real time modification on a local basis enables the present invention to accurately and effectively control the numerous permutation of a vast distributed power grid on a real time basis.

Embodiments of the present invention are operable to dynamically manage and control a distributed power grid having a plurality of power production resources. A plurality of local, regional and enterprise level cells within a distributed power grid are autonomously managed using control modules operating in conjunction with a multilayered network operating system. Each local control module is connectively coupled to a regional control module and in turn to an enterprise control module which interfaces with various management and control applications overseeing the distributed power grid. Power production and power consumption are continuously monitored and analyzed as is the system in which they operate. In one embodiment of the present invention, upon the determination that a region's power consumption exceeds its power producing capability, management applications, operating through the enterprise control module, dynamically reallocates power production resources throughout the grid. This reallocation of power production and distribution is continuously monitored and adjusted to ensure that the grid remains stable, reliable and safe. When such reallocation is not possible or does not occur in time, the appropriate regional control module will take corrective action to match load to generation either by shedding loads, tapping stored energy, or bringing on emergency generators.

While the present invention has been described by way of power grid management it is equally applicable and capable of distributed power management within commercial facilities, campuses, or anywhere there are distribution lines that carry power between rooms, buildings, renewable power sources, load management systems, electric vehicles and the like. This is true for larger commercial campuses, military bases, remote off-grid villages and the like. The present invention dynamically forms and manages distributed power systems using distributed resources, reconfigurable networks, and heterogeneous communication networks, distinguishing it from staticmicrogrids at a facility or remote location where generators and a few other resources are designed and configured to follow local loads. This dynamic ability of the distributed control system of the current invention to adapt to resource, network topology, and communication availability, variability, additions and deletions is a distinguishing feature of this invention.

As will be appreciated by one skilled in the relevant art, portions of the present invention can be implemented on a conventional or general-purpose computer system such as a main-frame computer, a personal computer (PC), a laptop computer, a notebook computer, a handheld or pocket computer, embedded computer, and/or a server computer. A typical system comprises a central processing unit(s) (CPU) or processor(s) coupled to a random-access memory (RAM), a read-only memory (ROM), a keyboard, a printer, a pointing device, a display or video adapter connected to a display device, a removable (mass) storage device (e.g., floppy disk, CD-ROM, CD-R, CD-RW, DVD, or the like), a fixed (mass) storage device (e.g., hard disk), a communication (COMM) port(s) or interface(s), and a network interface card (NIC) or controller (e.g., Ethernet). Although not shown separately, a real-time system clock is included with the system in a conventional manner The CPU comprises a suitable processor for implementing the present invention. The CPU communicates with other components of the system via a bi-directional system bus (including any necessary input/output (I/O) controller circuitry and other "glue" logic). The bus, which includes address lines for addressing system memory, provides data transfer between and among the various components. RAM serves as the working memory for the CPU. The ROM contains the basic input/output system code (BIOS), a set of low-level routines in the ROM that application programs and the operating systems can use to interact with the hardware, including reading characters from the keyboard, outputting characters to printers, and so forth.

Mass storage devices provide persistent storage on fixed and removable media such as magnetic, optical, or magnetic-optical storage systems, flash memory, or any other available mass storage technology. The mass storage may be shared on a network, or it may be a dedicated mass storage. Typically a fixed storage stores code and data for directing the operation of the computer system including an operating system, user application programs, driver and other support files, as well as other data files of all sorts. Typically, the fixed storage serves as the main hard disk for the system.

In basic operation, program logic (including that which implements the methodology of the present invention) is loaded from the removable storage or fixed storage into the main (RAM) memory for execution by the CPU. During operation of the program logic, the system accepts user input from a keyboard and pointing device, as well as speech-based input from a voice recognition system (not shown). The keyboard permits selection of application programs, entry of keyboard-based input or data, and selection and manipulation of individual data objects displayed on the screen or display device. Likewise, the pointing device, such as a mouse, track ball, pen device, or the like, permits selection and manipulation of objects on the display device. In this manner, these input devices support manual user input for any process running on the system.

The computer system displays text and/or graphic images and other data on the display device. The video adapter, which is interposed between the display and the system's bus, drives the display device. The video adapter, which includes video memory accessible to the CPU, provides circuitry that converts pixel data stored in the video memory to a raster signal suitable for use by a cathode ray tube (CRT) raster or liquid crystal display (LCD) monitor. A hard copy of the displayed information, or other information within the system, may be obtained from the printer or other output device.

The system itself communicates with other devices (e.g., other computers) via the NIC connected to a network (e.g., Ethernet network, Bluetooth wireless network, or the like). The system may also communicate with local occasionally-connected devices (e.g., serial cable-linked devices) via the COMM interface, which may include a RS-232 serial port, a Universal Serial Bus (USB) interface, or the like. Devices that will be commonly connected locally to the interface include laptop computers, handheld organizers, digital cameras, and the like.

As previously described, the present invention can also be employed in a network setting such as a local area network or wide area network and the like. Such networks may also include mainframe computers or servers, such as a gateway computer or application server (which may access a data repository or other memory source). A gateway computer serves as a point of entry into each network. The gateway may be coupled to another network by means of a communication link. Further, the gateway computer may be indirectly coupled to one or more devices. The gateway computer may also be coupled to a storage device (such as a data repository). The gateway computer may be implemented utilizing a variety of architectures.

Those skilled in the art will appreciate that the gateway computer may be located a great geographic distance from the network, and similarly, the devices may be located a substantial distance from the networks as well. For example, the network may be located in California while the gateway may be located in Texas, and one or more of the devices may be located in New York. The devices may connect to the wireless network using a networking protocol such as the TCP/IP over a number of alternative connection media such as cellular phone, radio frequency networks, satellite networks, etc. The wireless network preferably connects to the gateway using a network connection such as TCP or UDP (User Datagram Protocol) over IP, X.25, Frame Relay, ISDN (Integrated Services Digital Network), PSTN (Public Switched Telephone Network), etc. The devices may alternatively connect directly to the gateway using dial connection. Further, the wireless network may connect to one or more other networks (not shown) in an analogous manner.

In preferred embodiments, portions of the present invention can be implemented in software. Software programming code that embodies the present invention is typically accessed by the microprocessor from long-term storage media of some type, such as a hard drive. The software programming code may be embodied on any of a variety of known media for use with a data processing system such as a hard drive or CD-ROM. The code may be distributed on such media, or may be distributed from the memory or storage of one computer system over a network of some type to other computer systems for use by such other systems. Alternatively, the programming code may be embodied in the memory and accessed by the microprocessor using the bus. The techniques and methods for embodying software programming code in memory, on physical media, and/or distributing software code via networks are well known and will not be further discussed herein.

An implementation of the present invention can be executed in a Web environment, where software installation packages are downloaded using a protocol such as the Hyper-Text Transfer Protocol (HTTP) from a Web server to one or more target computers which are connected through the Internet. Alternatively, an implementation of the present invention may be executed in other non-Web networking environments (using the Internet, a corporate intranet or extranet, or any other network) where software packages are distributed for installation using techniques such as Remote Method Invocation (RMI), OPC or Common Object Request Broker Architecture (CORBA). Configurations for the environment include a client/server network as well as a multi-tier environment. Or, as stated above, the present invention may be used in a stand-alone environment, such as by an installer who wishes to install a software package from a locally-available installation media rather than across a network connection. Furthermore, it may happen that the client and server of a particular installation both reside in the same physical device, in which case a network connection is not required. Thus, a potential target system being interrogated may be the local device on which an implementation of the present invention is implemented. A software developer or software installer who prepares a software package for installation using the present invention may use a network-connected workstation, a stand-alone workstation, or any other similar computing device. These environments and configurations are well known in the art.

As will be understood by those familiar with the art, portions of the invention can be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component or portion of the present invention is implemented as software, the component can be implemented as a script, as a standalone program, as part of a larger program, as a plurality of separate scripts, and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language or for any specific operation system or environment. Accordingly, the disclosure of the present invention is intended to be illustrative but not limiting of the scope of the invention which is set forth in the following claims. While there have been described above the principles of the present invention in conjunction with the electrical distribution grid, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features that are already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived wherefrom.

We claim:

1. A distributive transmission and distribution power grid control system, comprising:
   a transmission and distribution power grid including a plurality of distributed energy resources wherein a subset of the plurality of distributed energy resources are controllable;
   a first machine, wherein the first machine executes instructions embodied as software to form a transmission and distribution grid model of the transmission and distribution power grid including distributed energy resources the subset of the plurality of distributed energy resources that are controllable;
   a second machine, independent from the first machine and external to the transmission and distribution grid model, wherein the second machine executes instructions embodied as software to receive a request for specified performance of a portion of the transmission and distribution power grid, to develop a set of control inputs to modify operation of the subset of the plurality of distributed energy resources that are controllable in order to meet the request for specified performance of the transmission and distribution power grid, and to apply the developed set of control inputs to the model of the subset of the plurality of distributed energy resources that are controllable to validate that the external simulated power system model of the portion of the transmission and distribution power grid meets the request for specified performance; and
   a third machine, communicatively coupled to the transmission and distribution power grid and the second machine and wherein the third machine executes instructions embodied as software to be a control interface to transform and deliver the developed set of control inputs to to the subset of the plurality of distributed energy resources that are controllable to control the transmission and distribution power grid.

2. The system of claim 1 wherein each distributed energy resource includes a network topology of a plurality of transmission and distribution components and a plurality of energy generation, storage, conditioning and demand components coupled to the transmission and distribution power grid.

3. The system of claim 2 wherein the model produced by the first machine is operable to represent combined interactions of the plurality of distributed energy resources to determine response characteristics of the network topology to various control inputs.

4. The system of claim 3 wherein the control interface transforms the set of control inputs into a standardized set of communication parameters for dissemination to the plurality of distributed energy resources of the transmission and distribution power grid.

5. The system of claim 4
   wherein the control interface receives operational and control response information regarding each distributed energy resource and issue queries regarding an ability of each distributed energy resource to meet operational and control response parameters.

6. The system of claim 4 wherein the control interface communicates operational and control response capabilities of the distributed energy resources to the second machine.

7. The system of claim 4 wherein the control interface mediates requests or commands to a control engine.

8. The system of claim 4
   wherein the control interface acts as an intermediary to moderate communications from other control engines and to report appropriate results and capabilities of an associated control engine to the other control engines without presenting a means by which the appropriate results were achieved.

9. The system of claim 1, wherein the second machine monitors performance of the transmission and distribution grid and responsive to performance of the transmission and distribution grid failing to meet the request for specified performance developing a new set of control inputs to modify operation of the subset of the plurality of distributed energy resources that are controllable in order to meet the request for specified performance of the transmission and distribution power grid.

10. The system of claim 9, wherein monitoring performance of the transmission and distribution grid and developing control inputs to modify operation of the subset of the plurality of distributed energy resources that are controllable in order to meet the request for specified performance of the transmission and distribution power grid is iterative.

11. The system of claim 1 wherein the control interface reports actions taken and results achieved to the second machine.

12. The system of claim 1 wherein the model changes dynamically based on changes to the transmission and distribution grid topology.

13. The system of claim 1 further comprising a communication network operable to convey changes in network topology to the first machine.

14. The system of claim 1 wherein plurality of distributed energy resources represent a virtual distributed energy resource.

15. The system of claim 1 wherein operational and control response characteristics of one or more distributed energy resources are monitored and the set of control inputs are dynamically modified to meet the request for specified performance.

16. A system for distributed energy resource control, comprising:
   a plurality of distributed energy resources in a transmission and distribution power grid wherein a subset of the plurality of distributed energy resources are controllable;
   a distributed control system having a plurality of control engines wherein one of the plurality of control engines issues a set of operating instructions to a simulation of the subset of the plurality of distributed energy resources that are controllable to control an external model simulating the transmission and distribution power grid, and, once validated, to the subset of the plurality of distributed energy resources that are controllable in the transmission and distribution power grid to meet a request for specified performance of the transmission and distribution power grid; and
   an interface interposed between, and communicatively coupled to, one of the plurality of control engines and either the plurality of distributed energy resources that are controllable in the external model simulating the transmission and distribution grid or the plurality of distributed energy resources in the transmission and distribution power grid that are controllable.

17. The system for distributed energy resource control of claim 16 wherein each distributed energy resource includes a network topology of a plurality of transmission and distribution grid components and a plurality of energy generation, storage, conditioning and demand components.

18. The system for distributed energy resource control of claim 17 wherein the interface is operable to transform the set of operating instruction into a standardized set of communication parameters for dissemination to other control interfaces.

19. The system for distributed energy resource control of claim 16 further comprising using one or more iterative processes to match a simulated operational and control response characteristics of the subset of the plurality of distributed energy resources that are controllable based on issued operating instructions with a desirable outcome before establishing operational control of the distributed energy resources by the control engine.

20. The system for distributed energy resource control of claim 19 wherein operational and control response characteristics of the subset of distributed energy resources responsive to the issued operating instructions are continually monitored by the control engine.

21. The system for distributed energy resource control of claim 16 wherein the external model simulating the plurality of distributed energy resources operates independently of each other model simulating another plurality of distributed energy resources and wherein each model can be a part of another independent simulation model.

22. The system for distributed energy resource control of claim 16 wherein the interface acts as an intermediary to moderate communications from other interfaces and to report appropriate results and capabilities to the other interfaces without presenting a means by which the results were achieved.

23. The system for distributed energy resource control of claim 16 wherein the external model simulating the transmission and distribution power grid is operable to dynamically model and modify operational and control response characteristics based on changes to the plurality of distributed energy resources or changes in transmission and distribution grid topology, and based on changes to other distributed energy resources and changes in transmission and distribution grid topology.

24. A method for distributed energy resource modeling and control in a transmission and distribution power grid wherein the transmission and distribution power grid includes a plurality of distributed energy resources and wherein a subset of the plurality of distributed energy resources are controllable by control inputs, the method comprising:
   creating an external simulated power system model of the transmission and distribution power grid including the subset of the plurality of distributed energy resources that are controllable;
   receiving a request for specified performance of a portion of the transmission and distribution power grid;
   developing a set of distributed energy resource control inputs to modify operation of the subset of the plurality of distributed energy resources that are controllable to meet the request for specified performance of the portion of the transmission and distribution power grid;
   applying the developed set of distributed energy resource control inputs to that portion of the external simulated power system model corresponding to the subset of the plurality of distributed energy resources that are controllable in order to validate that the developed set of control inputs will meet the request for specified performance; and
   responsive to validating that the portion of the transmission and distribution power grid in the external simulated power system model meets the request for specified performance based on the applied set of energy resource control inputs, deploying the set of distributed energy resource control inputs to the subset of the plurality of distributed energy resources that are controllable to control the transmission and distribution power grid.

25. The method of claim 24 wherein the external simulated power system model represents the plurality of distributed energy resources and includes a network topology of a plurality of transmission and distribution grid components.

26. The method of claim 24 wherein the plurality of distributed energy resources includes compound distributed energy resources.

27. The method of claim 24 further comprising
   iteratively monitoring performance of the transmission and distribution grid, and responsive to performance of the transmission and distribution grid failing to meet the request for specified performance, developing a new set of control inputs to modify operation of the subset of the plurality of distributed energy resources that are controllable in order to meet the request for specified performance of the portion of the transmission and distribution power grid.

28. The method of claim 27 further comprising identifying one or more control parameters for each of the subset of the plurality of distributed energy resources that can be controlled.

29. The method of claim 27 wherein responsive to operational control responses of the plurality of distributed energy resources failing to meet simulated operational control response expectations within the external independent simulated power system model, modifying the set of distributed control inputs until operational control responses of the plurality of distributed energy resources meet simulated operational control response expectations.

30. The method of claim 24 wherein responsive to the set of control inputs operational control responses of the distributed energy resources failing to meet the request for specified performance, replicating in an independent simulated environment the plurality of distributed energy resources and the set of control inputs to evaluate one or more modifications of the validated set of control inputs while operational control of the plurality of distributed energy resources is unaffected.

31. The method of claim 30 further comprising implementing the one or more modifications responsive to operational control response expectations being met in the replicated independent simulated environment.

32. The method of claim 24 wherein creating, developing and applying is conducted independently on a local, regional and enterprise basis.

33. The method of claim 32 wherein each instance of creating, developing and applying provides informational data for other distributed energy resource modeling and control.

* * * * *